(12) United States Patent
Crowther et al.

(10) Patent No.: US 9,273,163 B2
(45) Date of Patent: Mar. 1, 2016

(54) HYDROSILATION OF VINYL-TERMINATED MACROMONOMERS

(71) Applicant: ExxonMobil Chemical Patents Inc., Baytown, TX (US)

(72) Inventors: Donna J. Crowther, Seabrook, TX (US); Man Kit Ng, Annandale, NJ (US); Charles J. Ruff, Houston, TX (US); Patrick Brant, Seabrook, TX (US); Jacqueline A. Lovell, Houston, TX (US); Carlos R. Lopez-Barron, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 308 days.

(21) Appl. No.: 14/033,184

(22) Filed: Sep. 20, 2013

(65) Prior Publication Data

US 2014/0088263 A1 Mar. 27, 2014

Related U.S. Application Data

(60) Provisional application No. 61/704,725, filed on Sep. 24, 2012.

(51) Int. Cl.
*C08F 10/06* (2006.01)
*C08F 8/42* (2006.01)

(52) U.S. Cl.
CPC .. *C08F 10/06* (2013.01); *C08F 8/42* (2013.01)

(58) Field of Classification Search
CPC .................................. C08F 10/06; C08F 8/42
See application file for complete search history.

(56) References Cited

U.S. PATENT DOCUMENTS

| | | |
|---|---|---|
| 4,110,377 A | 8/1978 | Clerici et al. |
| 5,616,153 A | 4/1997 | Mike et al. |
| 6,100,224 A | 8/2000 | Peiffer et al. |
| 6,111,027 A | 8/2000 | Wright et al. |
| 6,217,984 B1 * | 4/2001 | Bruxvoort ............... B24D 3/28 428/195.1 |
| 7,183,359 B2 | 2/2007 | Hanna et al. |
| 7,247,385 B1 | 7/2007 | Tzoganakis et al. |
| 8,283,419 B2 | 10/2012 | Hagadorn et al. |
| 8,372,930 B2 | 2/2013 | Brant et al. |
| 8,399,725 B2 | 3/2013 | Brant et al. |
| 2005/0054793 A1 | 3/2005 | Reinking et al. |
| 2006/0027098 A1 * | 2/2006 | Lautamo ............... C07F 7/0849 95/82 |
| 2007/0042199 A1 * | 2/2007 | Chisholm ............... B63B 59/04 428/447 |
| 2009/0318647 A1 | 12/2009 | Hagadorn et al. |
| 2012/0245293 A1 | 9/2012 | Crowther et al. |

FOREIGN PATENT DOCUMENTS

| | | |
|---|---|---|
| EP | 0 413 114 | 2/1991 |
| JP | 2010/070673 | 4/2010 |
| WO | 97/06201 | 2/1997 |
| WO | 00/09577 | 2/2000 |
| WO | 2009/146340 | 12/2009 |

OTHER PUBLICATIONS

Amin, S. B. et al., "Versatile Pathways for In Situ Polyolefin Functionalization with Heteroatoms: Catalytic Chain Transfer", Angewandte Chemie, International Edition, 2008, 47, pp. 2006-2025.
Chung, T.C., "Synthesis of functional polyolefin copolymers with graft and block structures", Prog. Polym. Sci., 2002, 27, pp. 39-85.
Clerici, Mario G. et al., "Catalytic C-Alkylation of Secondary Amines with Alkenes", Synthesis, 1980, 4, pp. 305-306.
Herzon, S. et al., "Direct, Catalytic Hydroaminoalkylation of Unactivated Olefins with N-Alkyl Arylamines", J. Am. Chem. Soc., 2007, 129, pp. 6690-6691.
Herzon, S. et al., "Hydroaminoalkylation of Unactivated Olefins with Dialkylamines", J. Am. Chem. Soc., 2008, 130, pp. 14940-14941.
Kubiak, R. et al., "Titanium-Catalyzed Hydroaminoalkylation of Alkenes by C—H Bond Activation at $sp^3$ Centers in the α-Position to a Nitrogen Atom", Angewandte Chemie, International Edition, 2009, 48(6), pp. 1153-1156.
Lopez, R.G. et al., "Synthesis of well-defined polymer architectures by successive catalytic olefin polymerization and living/controlled polymerization reactions", Prog. Polym. Sci., 2007, 32, pp. 419-454.
Mukbaniani, O. et al., "Formation of Polymethylsiloxanes with Alkyl Side Groups", Journal of Applied Polymer Science, vol. 104, 2007, pp. 1176-1183.
Mukbaniani, O. et al., "Synthesis of Thermoreactive Polysiloxanes with Cyclic Fragments in the Side Chain", Journal of Applied Polymer Science, vol. 114, 2009, pp. 892-900.
Out, G. et al., "Poly(di-*n*-alkylsiloxane)s with Long Alkyl Side Groups", Macromolecules, 1994, 27, pp. 3310-3318.
Roesky, Peter W., "Catalytic Hydroaminoalkylation", Angewandte Chemie, International Edition, 2009, 48, pp. 4892-4894.
Seayad, Abdul Majeed et al., "Hydroaminomethylation of olefins using a rhodium carbine catalyst", Tetrahedron Letters, 2003, 44(8), pp. 1679-1683.
Segawa, Y., "Catalytic Hydroaminoalkylation of Alkenes", Yuki Gosei Kagaku Kyokaishi, 2009, 67(8), pp. 843-844.

* cited by examiner

*Primary Examiner* — Robert Harlan
(74) *Attorney, Agent, or Firm* — Catherine L. Bell

(57) ABSTRACT

This invention relates to the reaction product(s) of a polyalkylhydrosiloxane and a vinyl terminated macromonomer (VTM).

12 Claims, 8 Drawing Sheets

HYDROSILATION OF VINYL-TERMINATED MACROMONOMERS

CROSS-REFERENCE TO RELATED APPLICATION

This application claims priority to and the benefit of U.S. Provisional Application No. 61/704,725, filed Sep. 24, 2012, the disclosure of which is incorporated herein by reference in its entirety. This application relates to U.S. Pat. No. 8,501, 894; U.S. Publication No. 2012-0245293; and U.S. Ser. No. 61/704,611, filed Sep. 24, 2012.

FIELD OF THE INVENTION

This invention relates to functionalization of vinyl terminated polyolefins by hydrosilation (also known as hydrosilylation).

BACKGROUND OF THE INVENTION

Methods for the production of polyolefins with end-functionalized groups are typically multi-step processes that often create unwanted by-products and waste of reactants and energy. For reviews of methods to form end-functionalized polyolefins, see: (a) S. B. Amin and T. J. Marks, *Angewandte Chemie, International Edition*, 2008, 47, pp. 2006-2025; (b) T. C. Chung *Prog. Polym. Sci.* 2002, 27, pp. 39-85; and (c) R. G. Lopez, F. D'Agosto, C. Boisson *Prog. Polym. Sci.* 2007, 32, pp. 419-454. A process with a reduced number of steps, even one step, would be desirable.

U.S. Pat. No. 4,110,377 discloses secondary aliphatic amines alkylated with alpha-olefins, such as ethylene, propylene, hexene, and undecene. Likewise, several literature references disclose hydroaminoalkylation of olefins using various catalysts (see J. Am. Chem. Soc. 2008, 130, pp. 14940-14941; J. Am. Chem. Soc. 2007, 129, pp. 6690-6691; *Angewandte Chemie, International Edition*, 2009, 48, pp. 8361-8365; *Angewandte Chemie, International Edition*, 2009, 48, pp. 4892-4894; *Yuki Gosei Kagaku Kyokaishi* (2009), 67 (8), pp. 843-844; *Angewandte Chemie, International Edition* (2009), 48 (6), pp. 1153-1156; *Tetrahedron Letters* (2003), 44 (8), pp. 1679-1683; and *Synthesis* (1980), (4), pp. 305-306). Corey discloses low molecular weight olefins treated with hydrosilanes in the presence of $Cp_2MCl_2$ and n-BuLi to prepare low molecular weight hydrosilylated products.

None of the above references, however, disclose functionalization of polyolefins, particularly polyolefins having Mn's over 500 g/mol having large amounts of vinyl terminal groups.

U.S. Pat. No. 8,399,725 discloses certain vinyl terminated polymers that are functionalized, optionally, for use in lubricant applications.

U.S. Pat. No. 8,372,930 discloses certain vinyl terminated polymers that are functionalized in U.S. Pat. No. 8,399,725.

U.S. Pat. No. 8,283,419 discloses a process to functionalize propylene homo- or copolymer comprising contacting an alkene metathesis catalyst with a heteroatom containing alkene and a propylene homo- or copolymer having terminal unsaturation.

Additional references of interest include: WO9706201 (A1), Journal of Applied Polymer Science, Vol. 114, pp. 892-900 (2009), G. Out; A. Turetskii; M. Moller; D. Oelfin, Macromolecules, (1994), 27, p. 3310, J. Applied Polymer Science, 104, p. 1176 (2007), Japanese patent number JP 2010070673, U.S. Pat. Nos. 6,111,027; 7,183,359; 6,100, 224; and 5,616,153.

Thus, there is a need to develop a means to provide functionalized polyolefins (particularly end-functionalized) by efficient reactions, particularly reactions with good conversion, preferably under mild reaction conditions with a minimal number of steps, preferably one or two steps. The instant invention's use of hydrosilation to introduce silyl groups and/or carbon functionality is both a commercially economical and an "atom-economical" route to end-functionalized polyolefins.

End-functionalized polyolefins that feature a chemically reactive or polar end group are of interest for use in a broad range of applications as compatibilizers, tie-layer modifiers, surfactants, adhesives, and surface modifiers. Herein is described a novel method for their production by the reaction of vinyl-terminated polyolefins with hydrosilating agents. This method is useful for a range of vinyl terminated polyolefins, including isotactic polypropylene (iPP), atactic polypropylene (aPP), ethylene propylene copolymer (EP), polyethylene (PE), and particularly propylene copolymers with larger alpha-olefin comonomers such as butene, hexene octene, etc. The vinyl terminated polyolefin useful herein can be linear or branched.

SUMMARY OF THE INVENTION

This invention relates to the reaction product(s) of a polyalkylhydrosiloxane and a vinyl terminated macromonomer (VTM).

In one aspect, a polyolefin composition comprising one or more of the following formulae:

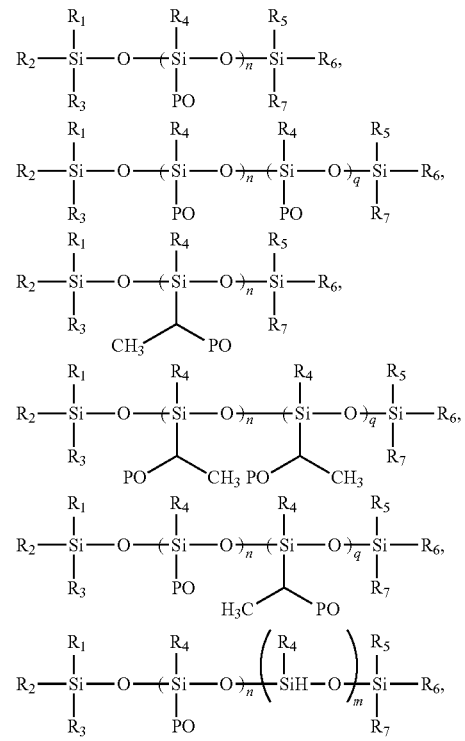

-continued

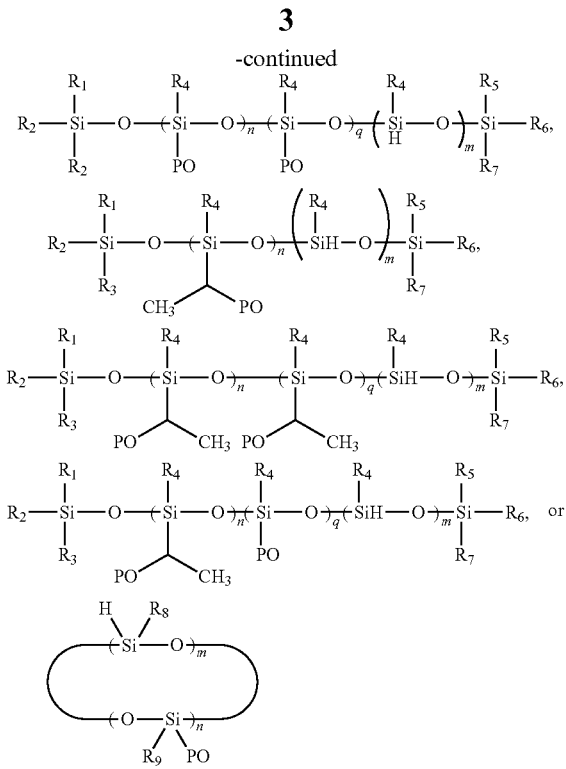

wherein each $R_1$, $R_2$, $R_3$, $R_4$, $R_5$, $R_6$, $R_7$, $R_8$, and $R_9$ is, independently, an alkyl group;

each PO is, independently, the residual portion of a vinyl terminated macromonomer (VTM) having had a terminal unsaturated carbon of an allylic chain and a vinyl carbon adjacent to the terminal unsaturated carbon;

each m is 0 to 1000;

each n is 1 to 1000;

each q is 1 to 1000; and m, n, and q can alternate or m, n, and q, can be randomly distributed throughout the polyolefin.

In another embodiment,

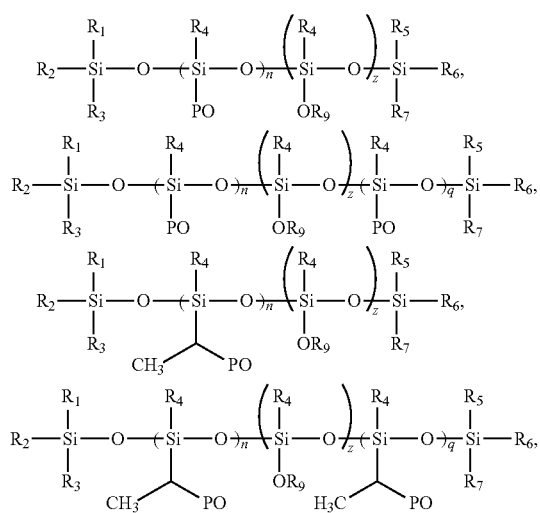

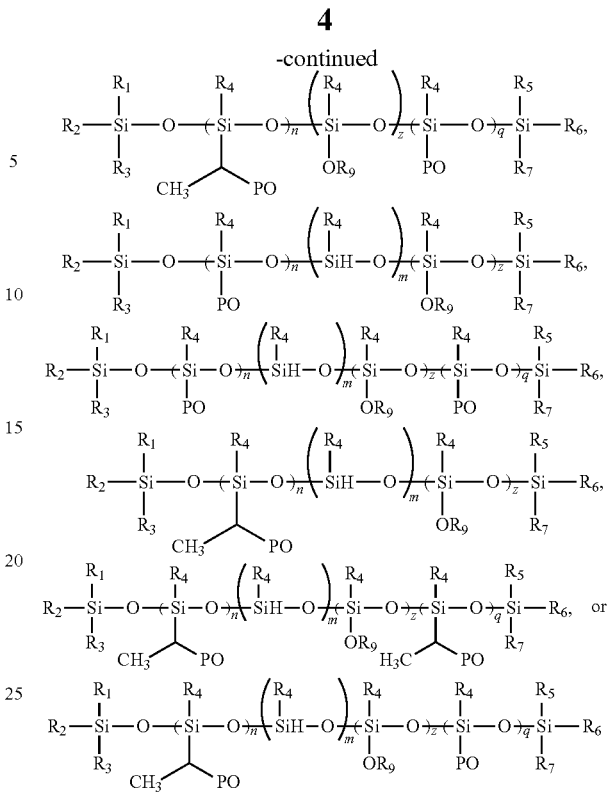

wherein each $R_1$, $R_2$, $R_3$, $R_4$, $R_5$, $R_6$, $R_7$, and $R_9$ is, independently, an alkyl group;

each PO is, independently, the residual portion of a vinyl terminated macromonomer (VTM) having had a terminal unsaturated carbon of an allylic chain and a vinyl carbon adjacent to the terminal unsaturated carbon;

each m is 0 to 1000;

each n is 1 to 1000;

each q is 1 to 1000;

each z is 1 to 100; and m, n, q, and z can alternate or m, n, q, and z can be randomly distributed throughout the polyolefin.

Alkylated PHMS (polymethylhydrosiloxane) backbones have been synthesized herein using vinyl terminated macromonomers (VTM) and a platinum hydrosilation catalyst. The degree of alkylation is dependent on reaction conditions and VTM composition. Further functionalization is possible by reaction with R—OH molecules including MeOH, H$_2$O and (NH$_2$)C$_x$—OH or self-condensation (dehydrocoupling) to give highly branched products, where R is an alkyl group and x is 2 to 12. All transformations can be done in a one-pot synthesis.

The latter condensation reactions can be mostly avoided and new materials made by reaction of the VTM alkylated PHMS (such as aPP-alkylated PHMS) with other reactive molecules such as MeOH to yield material with high levels of MeO-side chains. These would be reactive for grafting with inorganic substrates containing —OH moieties such as SiO$_2$.

DEFINITIONS

Figure 1:
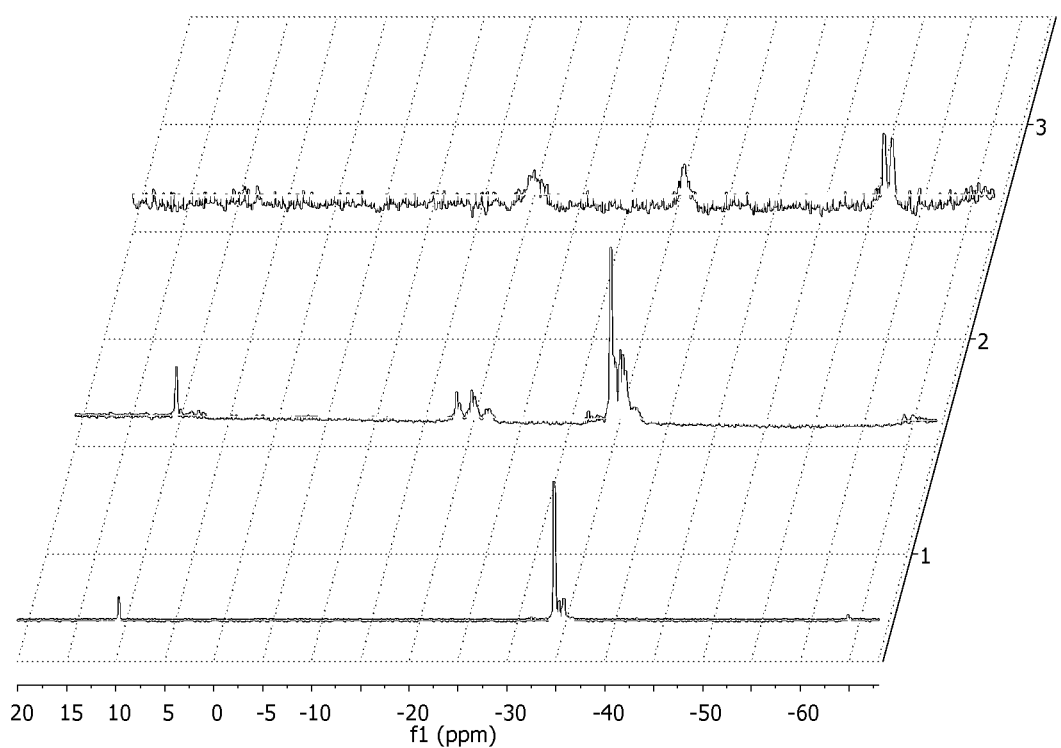
FIG. 1 is a series of NMR from Example 9: Spectrum 1 is PHMS; Spectrum 2 is VTM+PMHS; and Spectrum 3 is final methanolysis product of 2.

In the structures depicted throughout this specification and the claims, a solid line indicates a bond, and an arrow indicates that the bond may be dative.

As used herein, the new notation for the Periodic Table Groups is used as described in *Chemical and Engineering News*, 63 (5), p. 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer (or "co-oligomer" or "homo-oligomer") is a polymer having a low molecular weight. In some embodiments, an oligomer has a Mn of 21,000 g/mol or less (e.g., 2,500 g/mol or less); in other embodiments, an oligomer has a low number of mer units (such as 75 mer units or less).

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having two or more alpha-olefin units. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

The terms "catalyst" and "catalyst compound" are defined to mean a compound capable of initiating catalysis. In the description herein, the catalyst may be described as a catalyst precursor, a pre-catalyst compound, or a transition metal compound (for example, a metallocene compound), and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated invention compound.

A propylene polymer is a polymer having at least 50 mol % of propylene. As used herein, Mn is number average molecular weight as determined by proton nuclear magnetic resonance spectroscopy ($^1$H NMR) where the data is collected at 120° C. in a 5 mm probe using a spectrometer with a $^1$H frequency of at least 400 MHz. Data is recorded using a maximum pulse width of 45°, 8 seconds between pulses and signal averaging 120 transients. Unless stated otherwise, Mw is weight average molecular weight as determined by gel permeation chromatography (GPC), Mz is z average molecular weight as determined by GPC as described in the VINYL TERMINATED MACROMONOMERS section below, wt % is weight percent, and mol % is mole percent. Molecular weight distribution (MWD) is defined to be Mw (GPC) divided by Mn (GPC). Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, and "tol" is toluene.

DETAILED DESCRIPTION OF THE INVENTION

This invention relates to the reaction product(s) of a polyalkylhydrosiloxane and a vinyl terminated macromonomer (VTM).

In one aspect, a polyolefin composition comprising one or more of the following formulae:

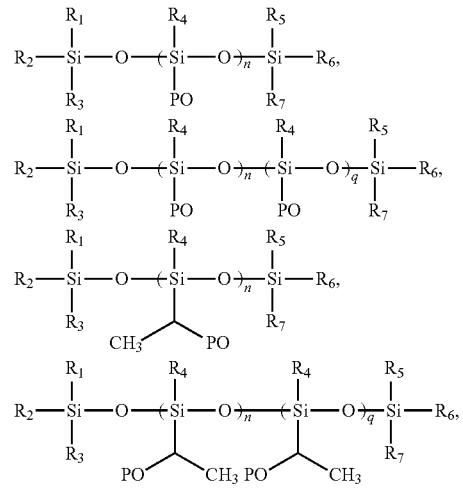

-continued

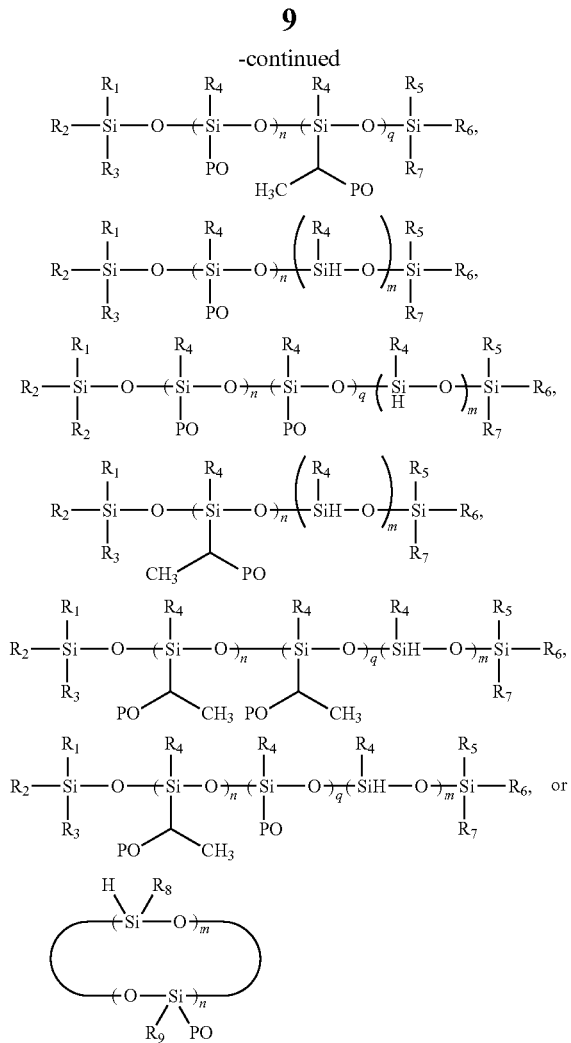

wherein
each $R_1$, $R_2$, $R_3$, $R_4$, $R_5$, $R_6$, $R_7$, $R_8$, and $R_9$ is, independently, an alkyl group;
each PO is, independently, the residual portion of a vinyl terminated macromonomer (VTM) having had a terminal unsaturated carbon of an allylic chain and a vinyl carbon adjacent to the terminal unsaturated carbon;
each m is 0 to 1000;
each n is 1 to 1000;
each q is 1 to 1000; and
m, n, and q can alternate or m, n, and q, can be randomly distributed throughout the polyolefin.

In another embodiment,

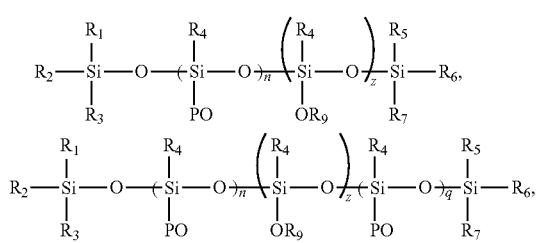

-continued

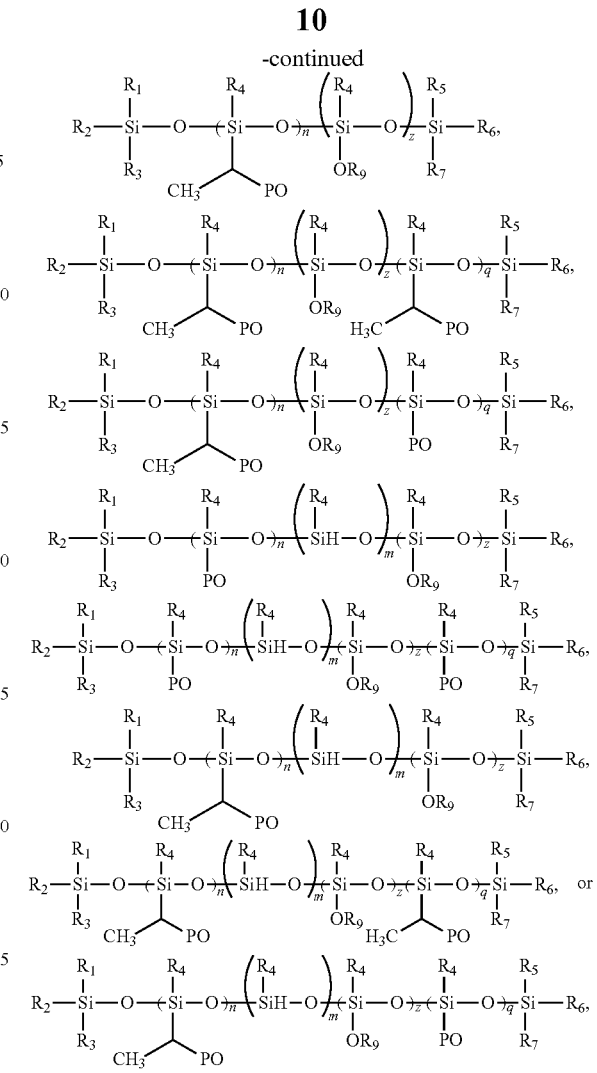

wherein
each $R_1$, $R_2$, $R_3$, $R_4$, $R_5$, $R_6$, $R_7$, and $R_9$ is, independently, an alkyl group;
each PO is, independently, the residual portion of a vinyl terminated macromonomer (VTM) having had a terminal unsaturated carbon of an allylic chain and a vinyl carbon adjacent to the terminal unsaturated carbon;
each m is 0 to 1000;
each n is 1 to 1000;
each q is 1 to 1000;
each z is 1 to 100; and
m, n, q, and z can alternate or m, n, q, and z can be randomly distributed throughout the polyolefin.

In a preferred embodiment of this invention, n+q is at least 5, preferably at least 6, preferably at least 8, preferably at least 10, preferably n+q is from 5 to 40, preferably from 6 to 30, preferably from 16 to 20, and PO has an Mn of from 160 to 30,000 g/mol, preferably from 180 to less than the entanglement molecular weight of PO, preferably from 200 to 20,000 g/mol, preferably from 300 to 10,000 g/mol, preferably from 1,000 to 5,000 g/mol.

In a preferred embodiment of this invention, n+q is 1, 2, 3, or 4, preferably 3 or 4, and PO has an Mn of from 160 to 40,000 g/mol, preferably from 180 to less than the entanglement molecular weight of PO, preferably from 200 to 30,000 g/mol, preferably from 300 to 20,000 g/mol, preferably from 1,000 to 15,000 g/mol, preferably from 2,000 to 10,000 g/mol.

In a particularly referred embodiment, the composition described herein shows shear thickening. Shear thickening is defined to be an increase in viscosity at increasing shear rates at the same temperature. Examples of shear thickening behavior are provided in FIGS. 8, 9, 10 and 11 for polymers, respectively. For information on Shear thickening please see Wagner, N. J. and Brady J. F., Physics Today, October 2009, 27, et seq.; Lee Y. S, and Wagner N. J., Rheol. Acta, 42, p. 199 (2003); and Lee Y. S., Wetzel E. D. and Wagner N. J., J. Matt. Sci., 38, p. 2825 (2003). Preferably, shear thickening is represented by a difference in viscosity at 10 rad/s and 100 rad/s at the same temperature. The difference is denoted as "Delta Viscosity" (Delta Viscosity=log Viscosity (at Frequency 2)–log Viscosity (at Frequency 1), where Frequency 2>Frequency 1) and represents the shear response of the fluid. Negative Delta Viscosity values represent shear thinning, zero value represents shear independence and positive values represent shear thickening. Preferably, the Delta Viscosity at 190° C. is at least 0.5 units, preferably at least 1 unit, preferably at least 1.5 units, where shear is measured according using the procedure described below for dynamic shear melt rheology. Preferably, the Delta Viscosity at 180° C. is at least 0.4 units, preferably at least 0.8 units, preferably at least 1.2 units, where shear is measured according using the procedure described below for dynamic shear melt rheology. Preferably, the Delta Viscosity at 170° C. is at least 0.3 units, preferably at least 0.6 units, preferably at least 0.9 units, where shear is measured according using the procedure described below for dynamic shear melt rheology. Preferably, the Delta Viscosity at 160° C. is at least 0.2 units, preferably at least 0.4 units, preferably at least 0.6 units, where shear is measured according using the procedure described below for dynamic shear melt rheology.

Dynamic shear melt rheological data is measured with MCR 501 rheometer (Anton-Paar) using serrated parallel plates (diameter=25 mm) at several temperatures ranging from 25° C. to 190° C. The samples are heated at 100° C. in a vacuum oven for 10 min to increase their fluidity and facilitate their loading into the rheometer. The measurements are made over the angular frequency ($\omega$) ranged from 0.01-100 rad/s. Depending on the molecular weight and temperature, strains of 1% and 10% were used and linearity of the response was verified. A nitrogen stream was circulated through the sample oven to minimize chain extension or cross-linking during the experiments. No stabilizers were added to the samples. A sinusoidal shear strain is applied to the material if the strain amplitude is sufficiently small and the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 90° although the stress is in phase with the strain rate). For viscoelastic materials $0°<\delta<90°$.

Dynamic shear melt rheological data from the different temperature tests were used to construct master curves of the elastic and viscous moduli (G' and G," respectively), using the time-temperature superposition (tTs) method. The tTs method relies on the Boltzman superposition principle, which assumes that all relaxation mechanisms and the stress magnitude at all frequencies have the same temperature-dependence. The tTs method consist on subjecting the dynamic moduli data measured at a temperature, T, to a horizontal shift (i.e., in the frequency axis) and to a vertical shift (i.e., in the moduli axis), until the data overlap with the corresponding data measured at a reference temperature, Tr. If such overlapping is achievable, the material is said to be thermo-rheologically simple. Hence, the master curves of the dynamic moduli, are obtained by plotting the reduced moduli, $b_T G'$ and $b_T G''$, versus the reduced frequency, $a_T \omega$. The horizontal and vertical shift factors, $a_T$ and $b_T$, respectively, are temperature dependent, although $b_T$ dependence is typically weak for entangled polymers. For information on time-temperature superposition please see Dealy J. and Plazek D., Rheol. Bull 78 pg 16 (2009).

In another embodiment, the composition produced herein (particularly where n is 3 and Mn is 3000) shows a tan delta (G"/G') of 1 or less at 50° C. and at least 30 or more at 80° C. Tan delta is determined by dynamic shear melt rheology. The frequency and the strain amplitude are maintained at 1 rad/s and 1%, respectively. The temperature is ramped down from 100° C. to 33° C. with a cooling rate of 1° C./min. A nitrogen stream was circulated through the sample oven to minimize chain extension or cross-linking during the experiments. No stabilizers were added to the samples.

Figure 5:
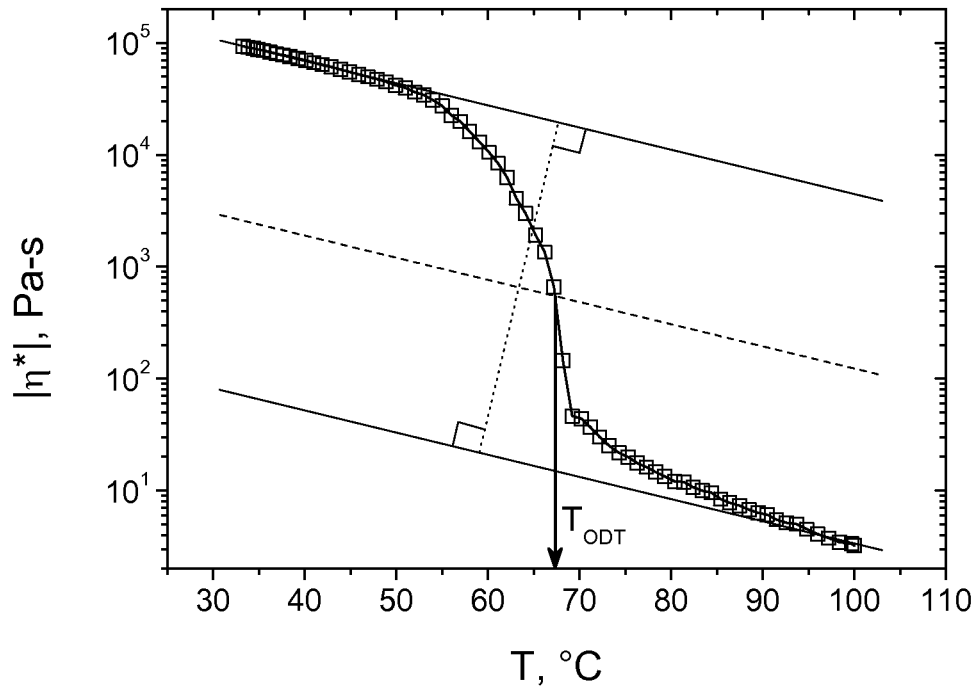
FIG. 5 provides the complex viscosity as a function of temperature for polymer Example 6 obtained by dynamic melt shear rheology using a frequency of 1 rad/s and a strain of 1%.
Figure 6:
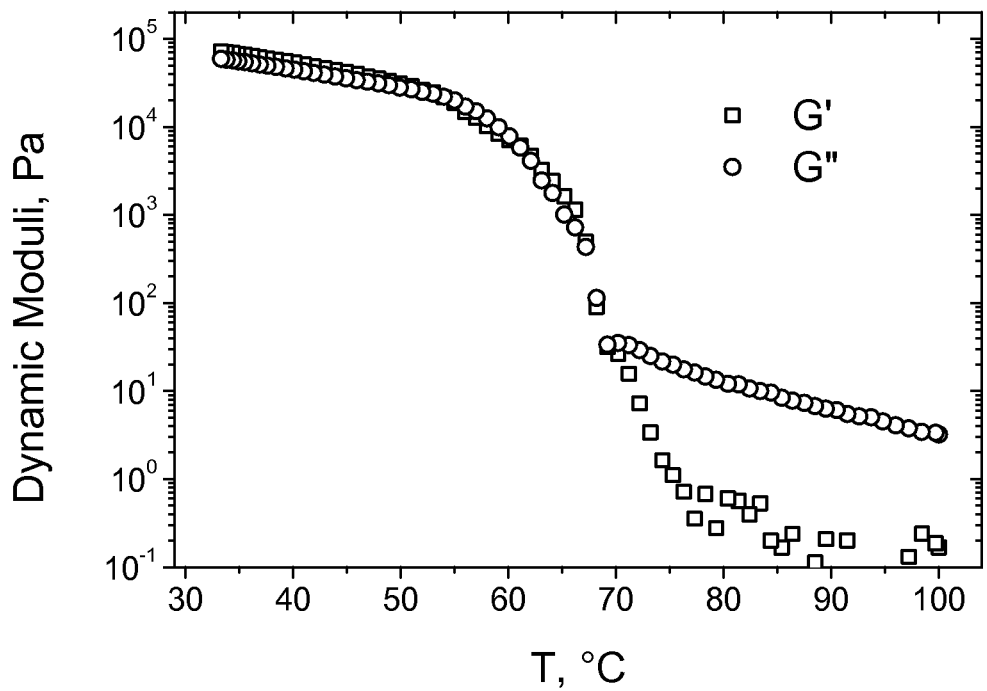
FIG. 6 provides dynamic moduli as a function of temperature for polymer Example 6 obtained by dynamic melt shear rheology using a frequency of 1 rad/s and a strain of 1%.
Figure 7:
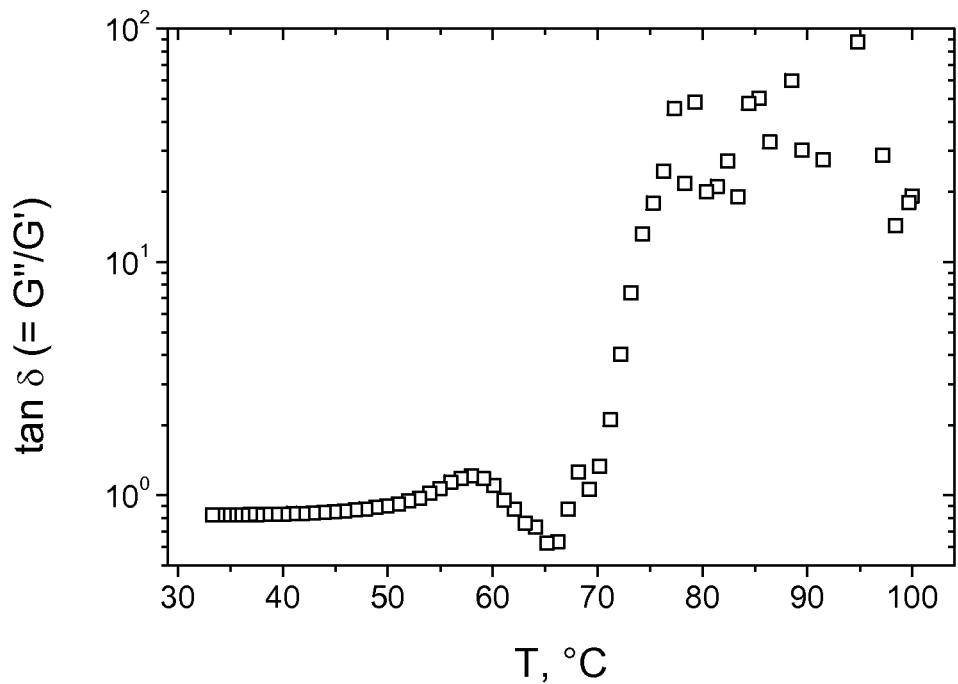
FIG. 7 provides tan delta as a function of temperature for polymer Example 6 obtained by dynamic melt shear rheology using a frequency of 1 rad/s and a strain of 1%.
Figure 8:
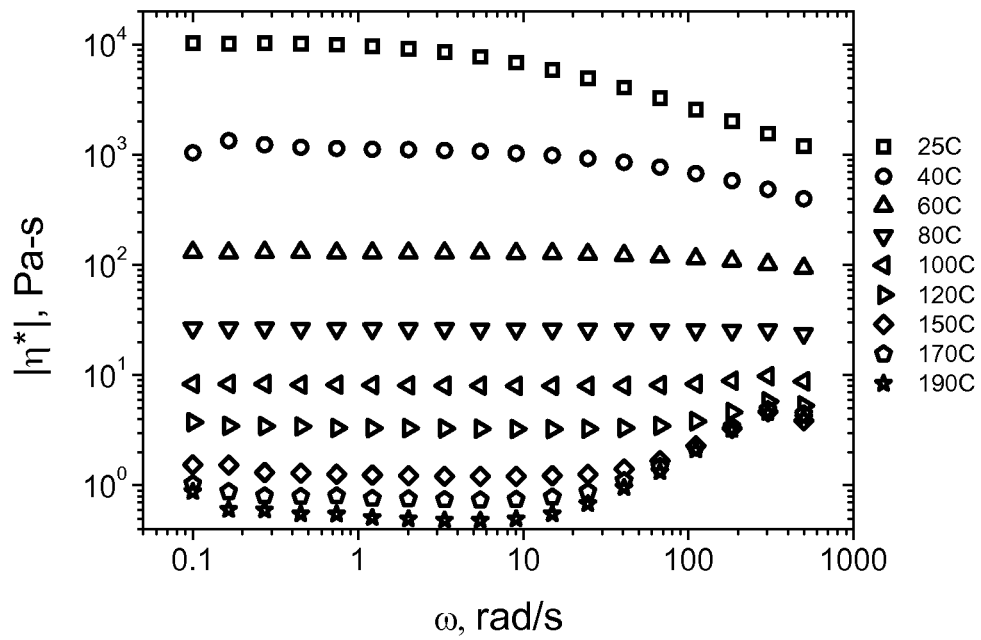
FIG. 8 provides complex viscosity as a function of frequency for polymer Example 10 obtained by dynamic melt shear rheology using strains of 1% and 10%. Shear thickening observed at T>60° C.
Figure 9:
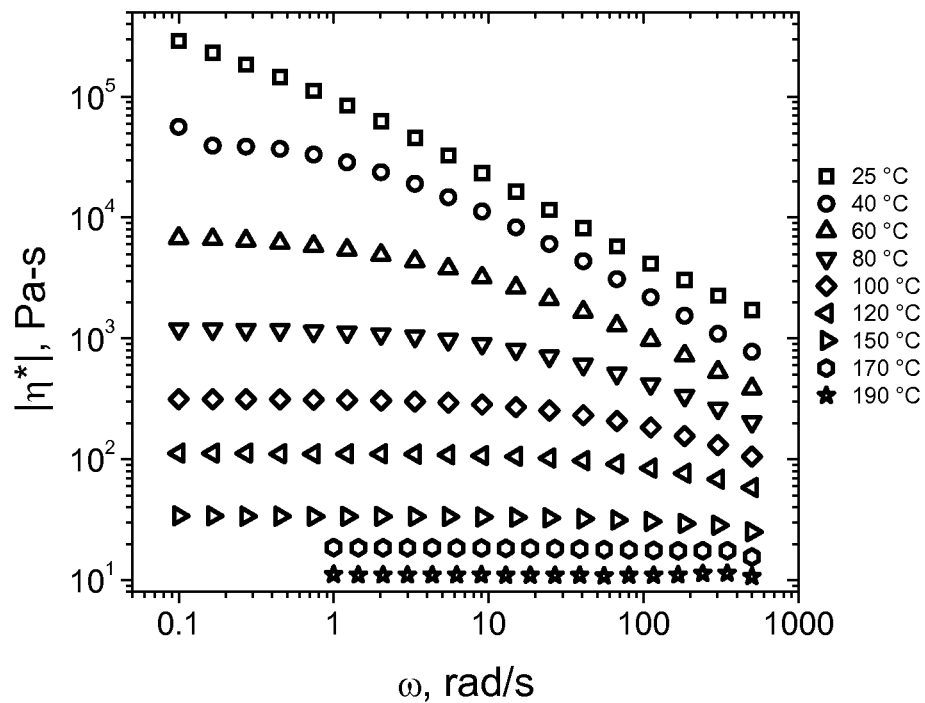
FIG. 9 provides complex viscosity as a function of frequency for polymer 12 obtained by dynamic melt shear rheology using strains of 1% and 10%. Shear thickening observed at T>150° C.
Figure 10:
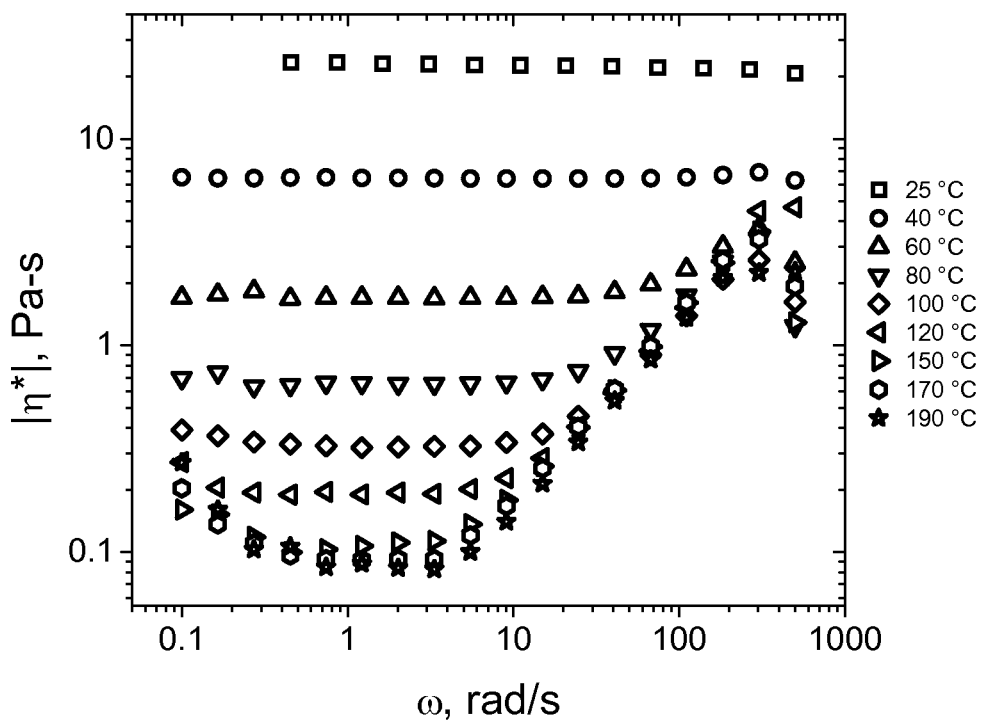
FIG. 10 provides complex viscosity as a function of frequency for polymer 16 obtained by dynamic melt shear rheology using strains of 1% and 10%. Shear thickening observed at T≥25° C.
Figure 11:
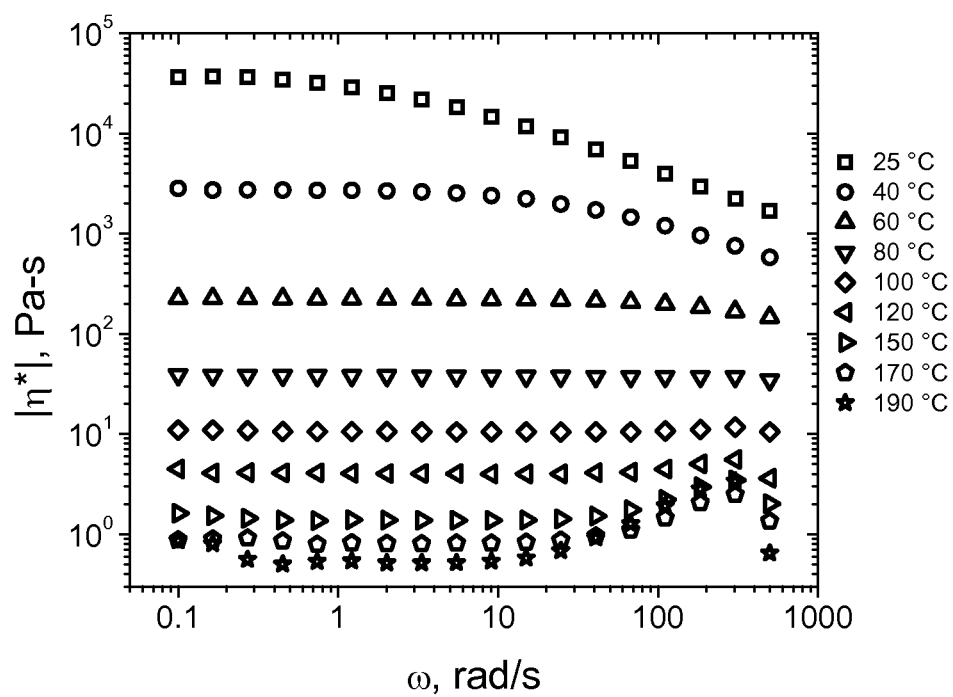
FIG. 11 provides complex viscosity as a function of frequency for polymer 20 obtained by dynamic melt shear rheology using strains of 1% and 10%. Shear thickening observed at T>80° C.

In another embodiment, the composition produced herein (particularly where n is 3 and Mn is 3000) shows a tan delta (G"/G') of 1 or less at 50° C. below the inflection point and at least 30 or more at 80° C. above the inflection point. This transition is identified as an order-disorder transition (ODT), characterized by an order-disorder transition temperature, $T_{ODT}$. The inflection point is determined by a geometrical method. The method consist on drawing two parallel lines, overlapping the viscosity data at high temperatures (above the $T_{ODT}$) and at low temperatures (below $T_{ODT}$). These lines are shown as solid lines in the FIG. 5. A third line (dotted line) is drawn perpendicular to the solid lines connecting them. A fourth line parallel to the solid lines and intersecting the dotted line in the center is drawn (dashed line). The intersection between the dashed line and the viscosity curve corresponds to the inflection point. The $T_{ODT}$ (temperature at the inflection point) is read in the abscissa.

PMHS (polymethylhydrosiloxane) of varying molar masses are commercially available in research grade quantities and are relatively inexpensive sources of Si—H for hydrosilation reactions. PMHS materials have been functionalized by a myriad of organic or inorganic molecules containing reactive groups such as carbonyl, vinyl, alkyne, hydroxy, thiol, or amine. The interest lies in part because of the inorganic Si—O— backbone in addition to the ability to modify through the Si—H moiety. The synthesis of comb-type polyolefin oligomers by hydrosilation of VTM's could potentially produce a range of materials with interesting properties depending on the alkyl composition, length and number. Such properties include increased thermal and oxidative stability, rheological and tribological. Potential exists for the use of these materials in engine oil applications and the synthesis of organic-inorganic hybrid materials. Alkyl-modified PMHS oligomers have previously been synthesized by hydrosilation of PMHS materials with low molar mass 1-alkenes from hexene to dodecene to give combs with short alkyl side chains. The availability of VTM's with varying $C_2$, $C_3$, and higher olefin content and much higher number average masses from 500 to 70,000 g/mol presents the potential synthesis of a variety of novel materials. Amorphous VTM's are available by solution polymerization of olefins as disclosed in U.S. Pat. No. 8,372,930; U.S. Pat. No. 8,318,998; and/or U.S. Pat. No. 8,455,597, which is incorporated by reference in its entirety herein. The Si—H bond is found to react with VTMs (aPP VTM, 2K Mn, exemplified) to yield alkylated PHMS under mild reaction conditions. The alkylated PHMS can be further coupled to yield materials with very low $g'_{vis}$ by GPC-3D and indicates these could be viscosity modifiers in polyolefin products such as motor oils or films depending on initial VTM composition. For example,

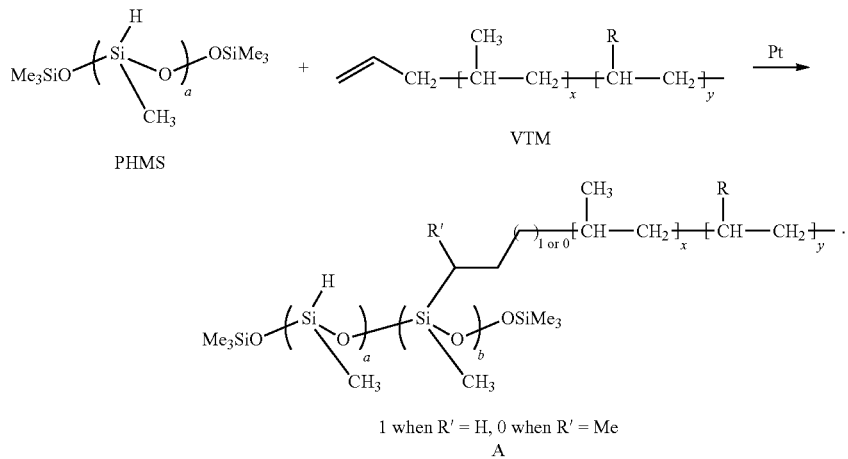

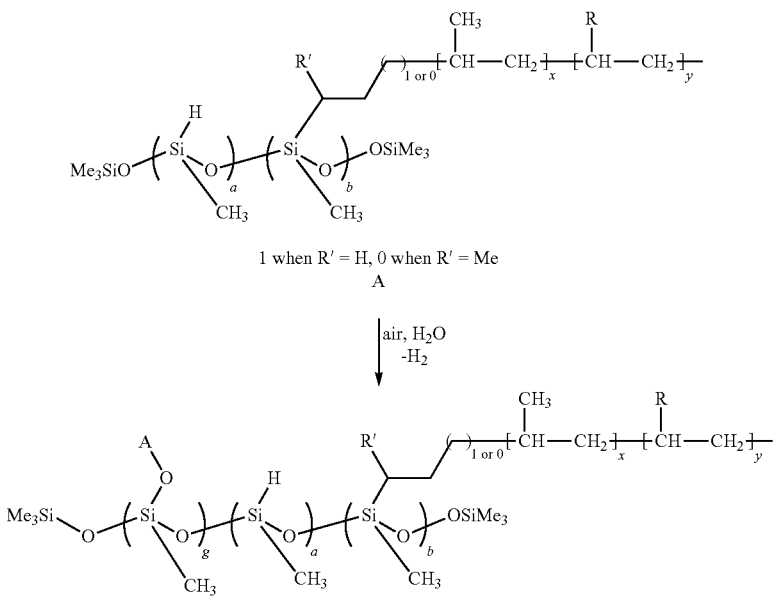

where R is H or an alkyl group, preferably a $C_2$ to $C_{40}$ alkyl group, preferably ethyl, propyl, hexyl, octyl, or decyl; R' is H or methyl; a is 50 to 100 mol % (based upon a+b+g); b is 50 to 0 mol % (based upon a+b+g); x is 100 to 30 mol % (based upon x+y); y is 0 to 70 mol % (based upon x+y); and g is 0 to 10 mol % (based upon a+b+g).

Instead of branched materials by dehydrogenative intermolecular coupling, the alkylated PHMS can be further modified with MeOH to yield MeO— bonded to Si. This would provide points of attachment with inorganic (or organic materials) with inorganic-OH groups.

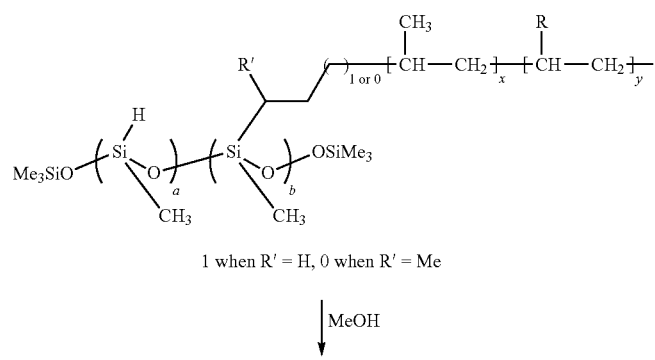

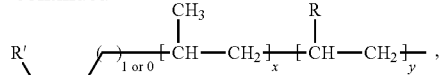
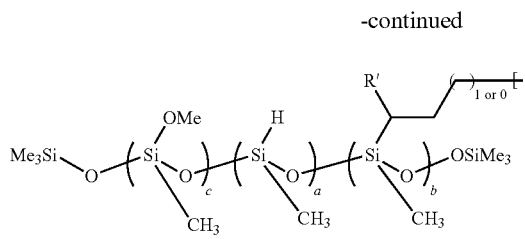

where R, R', a, b, x and y are as defined above.

Alternatively, a VTM could be reacted to form materials having the formulae:

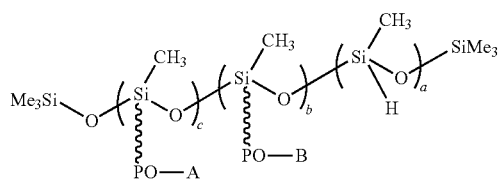

wherein each PO-A and PO-B, independently, are the residual terminal portions of VTMs which can be same or different;
c is from 1 to about 1000;
b is from 1 to about 1000;
a is from 0 to about 1000; and
the ~~
symbol means polymer.

In a preferred embodiment of the invention, any of the materials described herein may have a ratio of Si-alkylated to Si—H of about 1:1000, preferably of about 1:100, preferably of about 1:10 preferably about 1:1, preferably about 0.1:10, preferably about 0.1:100, as determined by $^{29}$Si NMR.

In a preferred embodiment of the invention, any of the materials described herein may have a ratio of Si—H to Si-alkylated of about 1:1000, preferably of about 1:100, preferably of about 1:10 preferably about 1:1, preferably about 0.1:10, preferably about 0.1:100, as determined by $^{29}$Si NMR.

Vinyl Terminated Macromonomers

A "vinyl terminated macromonomer," (also referred to as a "vinyl terminated polyolefin") as used herein, refers to one or more of:
(i) a vinyl terminated polymer having at least 5% allyl chain ends (preferably 15%, 20%, 30%, 40%, 50%, 60%, 70%, 80%, 90%, 95%, 98%, or 99%);
(ii) a vinyl terminated polymer having an Mn of at least 160 g/mol, preferably at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
(iii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;
(iv) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl terminated macromonomer has at least 40% allyl chain ends relative to total unsaturation;
(v) a co-oligomer having an Mn of 300 g/mol to 30,000 g/mol (measured by $^1$H NMR) comprising 10 mol % to 90 mol % propylene and 10 mol % to 90 mol % of ethylene, wherein the co-oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;
(vi) a propylene co-oligomer, comprising more than 90 mol % propylene and less than 10 mol % ethylene wherein the co-oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;
(vii) a propylene co-oligomer, comprising: at least 50 mol % propylene and from 10 mol % to 50 mol % ethylene, wherein the co-oligomer has: at least 90% allyl chain ends, an Mn of about 150 g/mol to about 20,000 g/mol, preferably 10,000 g/mol, and an isobutyl chain end to allylic vinyl group ratio of 0.8:1 to 1.2:1.0, wherein monomers having four or more carbon atoms are present at from 0 mol % to 3 mol %;
(viii) a propylene co-oligomer, comprising: at least 50 mol % propylene, from 0.1 mol % to 45 mol % ethylene, and from 0.1 mol % to 5 mol % $C_4$ to $C_{12}$ olefin, wherein the co-oligomer has: at least 90% allyl chain ends, an Mn of about 150 g/mol to about 10,000 g/mol, and an isobutyl chain end to allylic vinyl group ratio of 0.8:1 to 1.35:1.0;
(ix) a propylene co-oligomer, comprising: at least 50 mol % propylene, from 0.1 mol % to 45 mol % ethylene, and from 0.1 mol % to 5 mol % diene, wherein the co-oligomer has: at least 90% allyl chain ends, an Mn of about 150 g/mol to about 10,000 g/mol, and an isobutyl chain end to allylic vinyl group ratio of 0.7:1 to 1.35:1.0;
(x) a homo-oligomer, comprising propylene, wherein the co-oligomer has: at least 93% allyl chain ends, an Mn of about 500 g/mol to about 70,000 g/mol, alternately to about 20,000 g/mol, an isobutyl chain end to allylic vinyl group ratio of 0.8:1 to 1.2:1.0, and less than 1400 ppm aluminum;
(xi) vinyl terminated polyethylene having: (a) at least 60% allyl chain ends; (b) a molecular weight distribution of less than or equal to 4.0; (c) a g'$_{(vis)}$ of greater than 0.95; and (d) an Mn ($^1$H NMR) of at least 20,000 g/mol; and
(xii) vinyl terminated polyethylene having: (a) at least 50% allyl chain ends; (b) a molecular weight distribution of less than or equal to 4.0; (c) a g'$_{(vis)}$ of 0.95 or less; (d) an Mn ($^1$H NMR) of at least 7,000 g/mol; and (e) a Mn (GPC)/Mn ($^1$H NMR) in the range of from about 0.8 to about 1.2.

It is understood by those of ordinary skill in the art that when the VTM's, as described here, are reacted with another material the "vinyl" (e.g. the allyl chain end) is involved in the reaction and has been transformed. Thus, the language used herein describing that a fragment of the final product (typically referred to as PO in the formulae herein) is the residual portion of a vinyl terminated macromonomer (VTM) having had a terminal unsaturated carbon of an allylic chain and a vinyl carbon adjacent to the terminal unsaturated carbon, is meant to refer to the fact that the VTM has been incorporated in the product. Similarly stating that a product or material comprises a VTM means that the reacted form of the VTM is present, unless the context clearly indicates otherwise (such as a mixture of ingredients that do not have a catalytic agent present.)

In some embodiments, the vinyl terminated macromonomer has an Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprises one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers are further described in U.S. Pat. No. 8,426,659, which is hereby incorporated by reference.

In some embodiments, the vinyl terminated macromonomers may have an Mn (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:
(a) from about 20 mol % to 99.9 mol % (e.g., from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (e.g., $C_6$ to $C_{20}$) higher olefin;
(b) from about 0.1 mol % to 80 mol % (e.g., from about 5 mol % to 70 mol %, from about 10 mol % to about 65 mol %, from about 15 mol % to about 55 mol %, from about 25 mol % to about 50 mol %, or from about 30 mol % to about 80 mol %) of propylene; and wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers are further described in U.S. Pat. No. 8,399,724, hereby incorporated by reference.

In another embodiment, the vinyl terminated macromonomer has an Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:
(a) from about 80 mol % to about 99.9 mol % of at least one $C_4$ olefin, e.g., about 85 mol % to about 99.9 mol %, e.g., about 90 mol % to about 99.9 mol %;
(b) from about 0.1 mol % to about 20 mol % of propylene, e.g., about 0.1 mol % to about 15 mol %, e.g., about 0.1 mol % to about 10 mol %; and
wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Pat. No. 8,399,724, which is hereby incorporated by reference.

In other embodiments, the vinyl terminated macromonomer is a propylene co-oligomer having an Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the co-oligomer has at least X % allyl chain ends (relative to total unsaturations), where: 1) X=(−0.94 (mol % ethylene incorporated)+100{alternately 1.20(−0.94 (mol % ethylene incorporated)+100), alternately 1.50(−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20[1.83*(mol % ethylene incorporated)−83], alternately 1.50[1.83*(mol % ethylene incorporated)−83]}), when 70 mol % to 90 mol % ethylene is present in the co-oligomer. Such macromonomers are further described in U.S. Pat. No. 8,372,930, which is hereby incorporated by reference.

In other embodiments, the vinyl terminated macromonomer is a propylene co-oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the co-oligomer has: at least 93% allyl chain ends (e.g., at least 95%, e.g., at least 97%, e.g., at least 98%); a number average molecular weight (Mn) of about 400 g/mol to about 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0, and less than 1400 ppm aluminum, (e.g., less than 1200 ppm, e.g., less than 1000 ppm, e.g., less than 500 ppm, e.g., less than 100 ppm). Such macromonomers are further described in U.S. Pat. No. 8,372,930.

In other embodiments, the vinyl terminated macromonomer is a propylene co-oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the co-oligomer has: at least 90% allyl chain ends (e.g., at least 91%, e.g., at least 93%, e.g., at least 95%, e.g., at least 98%); an Mn of about 150 g/mol to about 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %, e.g., less than 0.5 mol %, e.g., at 0 mol %). Such macromonomers are further described in U.S. Pat. No. 8,372,930.

In other embodiments, the vinyl terminated macromonomer is a propylene co-oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the co-oligomer has: at least 90% allyl chain ends (e.g., at least 91%, e.g., at least 93%, e.g., at least 95%, e.g., at least 98%); a number average molecular weight (Mn) of about 150 g/mol to about 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers are further described in U.S. Pat. No. 8,372,930.

In other embodiments, the vinyl terminated macromonomer is a propylene co-oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the co-oligomer has at least 90% allyl chain ends (e.g., at least 91%, e.g., at least 93%, e.g., at least 95%, e.g., at least 98%); a number average molecular weight (Mn) of about 150 g/mol to about 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers are further described in U.S. Pat. No. 8,372,930.

In other embodiments, the vinyl terminated macromonomer is a propylene homo-oligomer, comprising propylene and less than 0.5 wt % comonomer, e.g., 0 wt % comonomer, wherein the co-oligomer has:
i) at least 93% allyl chain ends (e.g., at least 95%, e.g., at least 96%, e.g., at least 97%, e.g., at least 98%, e.g., at least 99%);
ii) a number average molecular weight (Mn) of about 500 g/mol to about 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);
iii) an isobutyl chain end to allylic vinyl group ratio of 0.8:1 to 1.3:1.0; and
iv) less than 1400 ppm aluminum, (e.g., less than 1200 ppm, e.g., less than 1000 ppm, e.g., less than 500 ppm, e.g., less than 100 ppm). Such macromonomers are also further described in U.S. Pat. No. 8,372,930.

The vinyl terminated macromonomers may be homopolymers, copolymers, terpolymers, and so on. Any vinyl terminated macromonomers described herein has one or more of:
(i) an isobutyl chain end to allylic vinyl group ratio of 0.8:1 to 1.3:1.0;
(ii) an allyl chain end to vinylidene chain end ratio of greater than 2:1 (e.g., greater than 2.5:1, greater than 3:1, greater than 5:1, or greater than 10:1);
(iii) an allyl chain end to vinylene ratio is greater than 1:1 (e.g., greater than 2:1 or greater than 5:1); and
(iv) at least 5% allyl chain ends (preferably 15%, 20%, 30%, 40%, 50%, 60%, 70%, 80%, 90%, 95%, 98%, or 99%).

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end.

An allyl chain end is represented by $CH_2CH\text{—}CH_2\text{—}$, as shown in the formula:

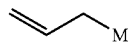

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination," is represented by the formula:

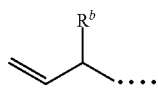

3-alkyl vinyl end group where "••••" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}$C NMR as set out below.

$^{13}$C NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}$C NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

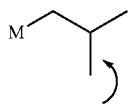

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends. The "isobutyl chain end to alpha bromo carbon ratio" is defined to be the ratio of the percentage of isobutyl chain ends to the percentage of brominated chain ends (at about 34 ppm).

In polymerizations comprising $C_4$ or greater monomers (or "higher olefin" monomers), the saturated chain end may be a $C_4$ or greater (or "higher olefin") chain end, as shown in the formula below:

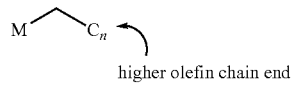

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end.

Mn ($^1$H NMR) is determined according to the following NMR method. $^1$H NMR data is collected at either 25° C. or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45°, 8 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Unless otherwise stated, Mn (GPC) is determined using the GPC-DRI method described below, however, Nota Bene: for the purpose of the claims, Mn is determined by $^1$H NMR. Mn, Mw, and Mz may be measured by using a Gel Permeation Chromatography (GPC) method using a High Temperature Size Exclusion Chromatograph (SEC, either from Waters Corporation or Polymer Laboratories), equipped with a differential refractive index detector (DRI). Molecular weight distribution (MWD) is Mw (GPC)/Mn (GPC). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PL gel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at 25° C. and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto, (dn/dc)=0.104 for propylene polymers and ethylene polymers, and 0.1 otherwise. Units of parameters used throughout this description of the SEC method are: concentration is expressed in g/cm³, molecular weight is expressed in g/mol, and intrinsic viscosity is expressed in dL/g.

The branching index ($g'_{(vis)}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{(vis)}$ is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 and k=0.000262 for linear propylene polymers, and α=0.695 and k=0.000181 for linear butene polymers. Mv is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

In an embodiment, the polyolefin is derived from a vinyl terminated propylene polymer. In an embodiment, the vinyl terminated propylene polymer is produced using a process comprising: contacting propylene, under polymerization conditions, with a catalyst system comprising an activator and at least one metallocene compound represented by the formula:

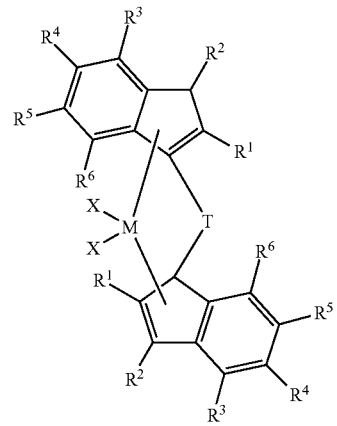

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$ is, independently, a $C_1$ to $C_{10}$ alkyl group;
each $R^2$ is, independently, a $C_1$ to $C_{10}$ alkyl group;
each $R^3$ is hydrogen;
each $R^4$, $R^5$, and $R^6$, is, independently, hydrogen or a substituted hydrocarbyl or unsubstituted hydrcarbonyl group, or a heteroatom;
T is a bridging group; and
further provided that any of adjacent $R^4$, $R^5$, and $R^6$ groups may form a fused ring or multicenter fused ring system where the rings may be aromatic, partially saturated or saturated; and
obtaining a propylene polymer having at least 50% allyl chain ends (relative to total unsaturations), as described in U.S. Pat. No. 8,455,597, which is incorporated by reference in its entirety herein.

In an embodiment, the vinyl terminated propylene polymer is produced using a process comprising:
1) contacting:
  a) one or more olefins with
  b) a transition metal catalyst compound represented by the formula:

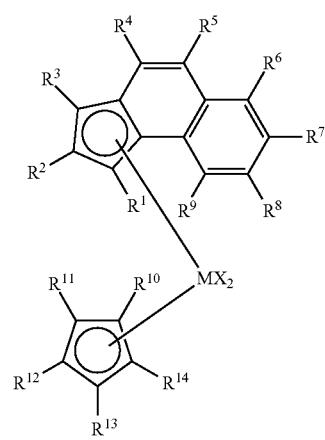

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group;
each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and
2) obtaining vinyl terminated polymer having an Mn of 300 g/mol or more and at least 30% allyl chain ends (relative to total unsaturation), as described in U.S. Pat. No. 8,318,998, which is incorporated by reference in its entirety herein.

In an embodiment, the polyolefin chain is derived from a higher olefin copolymer comprising allyl chain ends. In an embodiment, the higher olefin copolymer comprising allyl chain ends has an Mn of 300 g/mol or more (measured by $^1$H NMR) comprising:
(i) from about 20 to about 99.9 mol % of at least one $C_5$ to $C_{40}$ higher olefin;
(ii) from about 0.1 mol % to about 80 mol % of propylene; and wherein the higher olefin copolymer has at least 40% allyl chain ends, as described in U.S. Pat. No. 8,399,724, which is incorporated by reference in its entirety herein.

In an embodiment, the polyolefin chain is derived from a vinyl terminated branched polyolefin. In an embodiment, the vinyl terminated branched polyolefin has an Mn ($^1$H NMR) of 7,500 to 60,000 g/mol, comprising one or more alpha olefin derived units comprising ethylene and/or propylene, and having;
(i) 50% or greater allyl chain ends, relative to total number of unsaturated chain ends; and
(ii) a $g'_{vis}$ of 0.90 or less, as described in U.S. Publication No. 2012-0245299, which is incorporated by reference in its entirety herein.

In an embodiment, the polyolefin chain is derived from a vinyl terminated branched polyolefin produced by a process for polymerization, comprising:
(i) contacting, at a temperature greater than 35° C., one or more monomers comprising ethylene and/or propylene, with a catalyst system comprising a metallocene catalyst compound and an activator, wherein the metallocene catalyst compound is represented by the following formula:

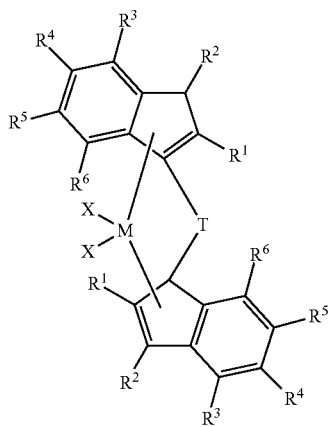

where: M is selected from the group consisting of zirconium or hafnium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated;
further provided that any of adjacent $R^4$, $R^5$, and $R^6$ groups may form a fused ring or multicenter fused ring system where the rings may be aromatic, partially saturated or saturated;
T is a bridging group represented by the formula $(Ra)_2J$, where J is one or more of C, Si, Ge, N or P, and each Ra is, independently, hydrogen, halogen, $C_1$ to $C_{20}$ hydrocarbyl or a $C_1$ to $C_{20}$ substituted hydrocarbyl, provided that at least one $R^3$ is a substituted or unsubstituted phenyl group, if any of $R^1$, $R^2$, $R^4$, $R^5$, or $R^6$ are not hydrogen;
(ii) converting at least 50 mol % of the monomer to polyolefin; and
(iii) obtaining a branched polyolefin having greater than 50% allyl chain ends, relative to total unsaturated chain ends and a Tm of 60° C. or more, as described in U.S. Publication No. 2012-0245299, which is incorporated by reference in its entirety herein.

In an embodiment of the invention, the polyolefin is derived from a vinyl terminated ethylene polymer, preferably a vinyl terminated polyethylene (preferably in particulate form) having:
(a) at least 60% allyl chain ends (preferably at least 65%, preferably at least 70%, preferably at least 75%, preferably at least 80%, preferably at least 85%, preferably at least 90%, preferably at least 95%, preferably at least 96%, preferably at least 97%, preferably at least 98%, preferably at least 99%, or preferably at least 100%);
(b) a molecular weight distribution of less than or equal to 4.0 (preferably less than or equal to 3.8, preferably less than or equal to 3.5, preferably less than or equal to 3.2, preferably less than or equal to 3.0, preferably less than or equal to 2.8, or preferably less than or equal to 2.5);
(c) an Mn ($^1$H NMR) of at least 20,000 g/mol (preferably at least 25,000 g/mol, preferably at least 30,000 g/mol, preferably at least 40,000 g/mol, preferably at least 50,000 g/mol, and, optionally, less than 125,000 g/mol, preferably less than 120,000, or preferably less than 110,000);
(d) optionally, an Mn (GPC)/Mn ($^1$H NMR) in the range of from about 0.8 to about 1.2 (preferably from about from 0.9 to about 1.1, preferably from about 0.95 to about 1.1); and
(e) optionally, a $g'_{(vis)}$ of greater than 0.95 (preferably greater than 0.96, preferably greater than 0.98, preferably greater than 0.98, and, optionally, preferably less than or equal to 1.0).

Preferably, the vinyl terminated ethylene polymers are prepared by a process comprising:
(a) contacting ethylene with a supported metallocene catalyst system;
wherein the supported catalyst system comprises: (i) a support material; (ii) an activator having from about 1 wt % to about 14 wt % trimethylaluminum, based on the weight of the activator; (iii) a metallocene compound represented by the formula:

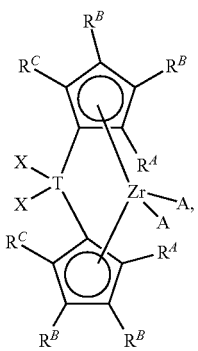

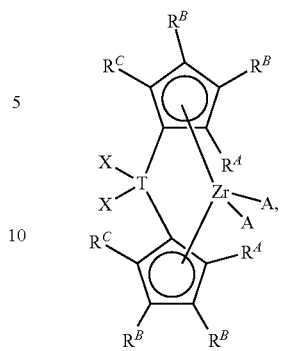

wherein: T is Si or Ge; each RA is a $C_1$ to $C_{20}$ substituted or unsubstituted hydrocarbyl group; each $R^B$ is, independently, H, or a $C_1$ to $C_8$ substituted or unsubstituted hydrocarbyl group, or a group represented by the formula —$CH_2R^x$; wherein $R^x$ is a $C_1$ to $C_{20}$ substituted or unsubstituted hydrocarbyl group, provided that at least one $R^B$ is methyl or a group represented by the formula —$CH_2R^x$; each $R^C$ is, independently, H or a $C_1$ to $C_{20}$ substituted or unsubstituted hydrocarbyl group; each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; each X is, independently, hydrogen, halogen or a $C_1$ to $C_{20}$ hydrocarbyl, and two X groups can form a cyclic structure including aromatic, partially saturated, or saturated cyclic or fused ring system; further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated; and (b) obtaining a vinyl terminated polyethylene having: (i) at least 60% allyl chain ends;

(ii) a molecular weight distribution of less than or equal to 4.0; and (iii) a Mn ($^1$H NMR) of at least 20,000 g/mol. Preferably, the vinyl terminated ethylene polymers are made according the process (and using the catalyst systems) described in (U.S. Ser. No. 61/704,606, filed Sep. 24, 2012, entitled, Production of Vinyl Terminated Polyethylene Using Supported Catalyst System).

In an embodiment of the invention, the polyolefin is derived from a vinyl terminated ethylene polymer, preferably a vinyl terminated polyethylene having: (i) at least 50% allyl chain ends (preferably 60%, 70%, 80%, 90%, 95%, 96%, 97%, 98%, 99%, or 100%); (ii) a molecular weight distribution of less than or equal to 4.0 (preferably less than or equal to 3.8, 3.6, 3.5, 3.4, 3.2, 3.0, 2.8, or 2.5); (iii) a g'$_{(vis)}$ of 0.95 or less (preferably less than 0.93, 0.90, 0.88, or 0.85); (iv) an Mn ($^1$H NMR) of at least 7,000 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 125,000 g/mol); and (v) a Mn (GPC)/Mn ($^1$H NMR) in the range of from about 0.8 to about 1.2 (preferably from 0.85 to 1.15, 0.90 to 1.10, and 0.95 to 1.00). Preferably, the vinyl terminated ethylene polymers are produced by a process comprising:

(a) contacting ethylene with a metallocene catalyst system; wherein the catalyst system comprises:

(i) an ionizing activator;

(ii) a metallocene compound represented by the formula:

wherein T is Si or Ge; each $R^A$ is a $C_1$ to $C_{20}$ substituted or unsubstituted hydrocarbyl group; each $R^B$ is, independently, H or a $C_1$ to $C_8$ substituted or unsubstituted hydrocarbyl group, or a group represented by the formula —$CH_2R^x$; wherein $R^x$ is a $C_1$ to $C_{20}$ substituted or unsubstituted hydrocarbyl group, provided that at least one $R^B$ is methyl or a group represented by the formula —$CH_2R^x$; each $R^C$ is, independently, H or a $C_1$ to $C_{20}$ substituted or unsubstituted hydrocarbyl group; each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; each X is, independently, hydrogen, halogen, or a $C_1$ to $C_{20}$ hydrocarbyl, and two X groups can form a cyclic structure including aromatic, partially saturated, or saturated cyclic or fused ring system; further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated; and (b) obtaining a vinyl terminated polyethylene having: (i) at least 50% allyl chain ends;

(ii) a molecular weight distribution of less than or equal to 4.0; (iii) a g'$_{(vis)}$ of 0.95 or less; and (iv) a Mn ($^1$H NMR) of at least 7,000 g/mol; and (e) a Mn (GPC)/Mn ($^1$H NMR) in the range of from about 0.8 to about 1.2. Preferably, the vinyl terminated ethylene polymers are made according the process (and using the catalyst systems) described in (U.S. Ser. No. 61/704,604, filed Sep. 24, 2012, entitled, Production of Vinyl Terminated Polyethylene).

In any of the polymerizations described herein, the activator may be an alumoxane, an aluminum alkyl, a stoichiometric activator (also referred to as an ionizing activator), which may be neutral or ionic, and/or a conventional-type cocatalyst, unless otherwise stated. Preferred activators typically include alumoxane compounds, modified alumoxane compounds, stoichiometric activators, and ionizing anion precursor compounds that abstract one reactive, σ-bound, metal ligand making the metal complex cationic and providing a charge-balancing noncoordinating or weakly coordinating anion.

Alumoxane Activators

In an embodiment of the invention, alumoxane activators are utilized as an activator in the catalyst composition, preferably methylalumoxane (MAO), modified methylalumoxane (MMAO), ethylalumoxane, and/or isobutylalumoxane. Preferably, the activator is a TMA-depleted activator (where TMA means trimethylaluminum). Any method known in the art to remove TMA may be used. For example, to produce a TMA-depleted activator, a solution of alumoxane (such as methylalumoxane), for example, 30 wt % in toluene may be diluted in toluene and the aluminum alkyl (such as TMA in the case of MAO) is removed from the solution, for example, by combination with trimethylphenol and filtration of the solid. In such embodiments, the TMA-depleted activator comprises from about 1 wt % to about 14 wt % trimethylaluminum (preferably less than 13 wt %, preferably less than 12 wt %, preferably less than 10 wt %, preferably less than 5 wt %, or preferably 0 wt %, or, optionally, greater than 0 wt % or greater than 1 wt %).

Stoichiometric Activators

The catalyst systems useful herein may comprise one or more stoichiometric activators. A stoichiometric activator is a non-alumoxane compound which when combined in a reaction with the catalyst compound (such as a metallocene compound) forms a catalytically active species, typically at molar ratios of stoichiometric activator to metallocene compound of 10:1 or less (preferably 5:1, more preferably 2:1, or even more preferably 1:1), however is within the scope of this invention to use a molar ratio of stoichiometric activator to metallocene compound of greater than 10:1 as well. Useful stoichiometric (or non-alumoxane) activator-to-catalyst ratios range from 0.5:1 to 10:1, preferably 1:1 to 5:1, although ranges of from 0.1:1 to 100:1, alternately from 0.5:1 to 200:1, alternately from 1:1 to 500:1 alternately from 1:1 to 1000:1 may be used.

Stoichiometric activators are non-alumoxane compounds which may be neutral or ionic, such as tri(n-butyl) ammonium tetrakis(pentafluorophenyl) borate, a tris perfluorophenyl boron metalloid precursor, or a tris perfluoronaphthyl boron metalloid precursor, polyhalogenated heteroborane anions (WO 98/43983), boric acid (U.S. Pat. No. 5,942,459), or a combination thereof. It is also within the scope of this invention to use stoichiometric activators alone or in combination with alumoxane or modified alumoxane activators.

Neutral Stoichiometric Activators

Examples of neutral stoichiometric activators include trisubstituted boron, tellurium, aluminum, gallium and indium or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic Stoichiometric Activators

Ionic stoichiometric activators may contain an active proton, or some other cation associated with, but not coordinated to, or only loosely coordinated to, the remaining anion of the activator. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Ionic stoichiometric activators comprise a cation, which is preferably a Bronsted acid capable of donating a proton, and a compatible non-coordinating anion. Preferably, the anion is relatively large (bulky), capable of stabilizing the catalytically active species (preferably a group 4 catalytically active species) which is formed when the catalyst (such as a metallocene compound) and the stoichiometric activator are combined. Preferably the anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A and EP 0 277,004 A: 1) anionic coordination complexes comprising a plurality of lipophilic radicals covalently coordinated to and shielding a central charge-bearing metal or metalloid core, and 2) anions comprising a plurality of boron atoms, such as carboranes, metallacarboranes, and boranes.

Ionic stoichiometric activators comprise an anion, preferably a non-coordinating anion. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the catalyst (such as metallocene) cation in the sense of balancing its ionic charge at +1, yet retain sufficient lability to permit displacement by an ethylenically or acetylenically unsaturated monomer during polymerization.

In a preferred embodiment of this invention, the ionic stoichiometric activators are represented by the following formula (1):

$$(Z)_d^+ A^{d-} \qquad (1)$$

wherein $(Z)_d^+$ is the cation component and $A^{d-}$ is the anion component; where Z is (L-H) or a reducible Lewis Acid, L is an neutral Lewis base; H is hydrogen; $(L-H)^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation $(L-H)_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, $(Z)_d^+$ is preferably represented by the formula: $(Ar_3C)^+$, where Ar is aryl or aryl substituted with a heteroatom, a $C_1$ to $C_{40}$ hydrocarbyl, or a substituted $C_1$ to $C_{40}$ hydrocarbyl, preferably $(Z)_d^+$ is represented by the formula: $(Ph_3C)^+$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ includes those having the formula $[M^{k+}Q_n]^{d-}$ wherein k is 1, 2, or 3; n is 1, 2, 3, 4, 5, or 6, preferably 3, 4, 5 or 6; (n−k)=d; M is an element selected from group 13 of the Periodic Table of the Elements, preferably boron or aluminum; and each Q is, independently, a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In other embodiments of this invention, the ionic stoichiometric activator may be an activator comprising expanded anions, represented by the formula:

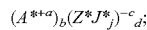

wherein A* is a cation having charge +a; Z* is an anion group of from 1 to 50 atoms not counting hydrogen atoms, further containing two or more Lewis base sites; J* independently each occurrence is a Lewis acid coordinated to at least one Lewis base site of Z*, and optionally two or more such J* groups may be joined together in a moiety having multiple Lewis acid functionality; j is a number from 2 to 12; and a, b, c, and d are integers from 1 to 3, with the proviso that a×b is equal to c×d. Examples of such activators comprising expandable anions may be found in U.S. Pat. No. 6,395,671, which is fully incorporated herein by reference.

Examples of ionic stoichiometric activators useful in the catalyst system of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts such as: di-(1-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

Bulky Ionic Stoichiometric Activators

"Bulky activator" as used herein refers to ionic stoichiometric activators represented by the formula:

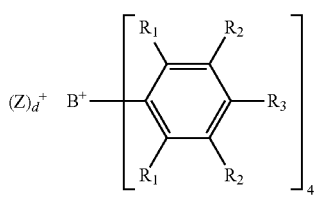

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
$(Z)_d^+$ is the cation component; where Z is (L-H) or a reducible Lewis Acid, L is an neutral Lewis base; H is hydrogen; (L-H)$^+$ is a Bronsted acid; and d is an integer from 1 to 3;
wherein the boron anion component has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_S$ | MV Per subst. (Å$^3$) | Total MV (Å$^3$) |
|---|---|---|---|---|---|
| Dimethylanilinium tetrakis(perfluoronaphthyl)borate | | $C_{10}F_7$ | 34 | 261 | 1044 |
| Dimethylanilinium tetrakis(perfluorobiphenyl)borate | | $C_{12}F_9$ | 42 | 349 | 1396 |

| Activator | Structure of boron substituents | Molecular Formula of each substituent | MV Per subst. $V_S$ (Å³) | Total MV (Å³) |
|---|---|---|---|---|
| [4-tButyl-PhNMe$_2$H] [(C$_6$F$_3$(C$_6$F$_5$)$_2$)$_4$B] | (structure shown) | C$_{18}$F$_{13}$ | 62 | 515 | 2060 |

Exemplary bulky ionic stoichiometric activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], (where Ph is phenyl and Me is methyl), and the types disclosed in U.S. Pat. No. 7,297,653.

In another embodiment of this invention, an activation method using ionic compounds not containing an active proton but capable of producing a bulky ligand metallocene catalyst cation and their non-coordinating anion are also contemplated, and are described in EP 0 426 637 A, EP 0 573 403 A, and U.S. Pat. No. 5,387,568, which are all herein incorporated by reference.

In another embodiment of this invention, inventive processes also can employ stoichiometric activator compounds that are initially neutral Lewis acids but form a cationic metal complex and a noncoordinating anion, or a zwitterionic complex upon reaction with the metallocene compounds. For example, tris(pentafluorophenyl) boron or aluminum may act to abstract a hydrocarbyl or hydride ligand to yield an invention cationic metal complex and stabilizing noncoordinating anion, see EP 0 427 697 A and EP 0 520 732 A for illustrations of analogous group 4 metallocene compounds. Also, see the methods and compounds of EP 0 495 375 A. For formation of zwitterionic complexes using analogous group 4 compounds, see U.S. Pat. Nos. 5,624,878; 5,486,632; and 5,527,929.

In another embodiment of this invention, another suitable ionic stoichiometric activator comprises a salt of a cationic oxidizing agent and a noncoordinating, compatible anion represented by the formula:

$$(X^{e+})_d(A^{d-})_e \qquad (3)$$

wherein $X^{e+}$ is a cationic oxidizing agent having a charge of e+; e is 1, 2, or 3; $A^{d-}$ is a non-coordinating anion having the charge d–; and d is 1, 2, or 3. Examples of $X^{e+}$ include: ferrocenium, hydrocarbyl-substituted ferrocenium, Ag$^+$, or Pb$^{+2}$. Preferred embodiments of $A^{d-}$ are those anions previously defined with respect to the Bronsted acid containing activators, especially tetrakis(pentafluorophenyl)borate.

Activator Combinations

It is within the scope of this invention that metallocene compounds can be combined with one or more activators or activation methods described above. For example, a combination of activators have been described in U.S. Pat. Nos. 5,153,157; 5,453,410; European Publication No. EP 0 573 120 B1; and PCT Publication Nos. WO 94/07928 and WO 95/14044. These documents all discuss the use of an alumoxane in combination with a stoichiometric activator.

In another embodiment, the vinyl terminated macromonomer may be a vinyl terminated ethylene macromonomer. In some embodiments, a phenoxyimine-based catalyst (a Mitsui FI catalyst) or a pyrroleimine-based catalyst (a Mitsui PI catalyst) can be used to prepare the vinyl terminated ethylene macromonomer. These catalysts comprise (a) a transition metal (preferably Ti) compound having phenoxyimine or pyrroleimine as a ligand, and (b) one or more kind(s) of compound selected from (b-1) an organic metal compound, (b-2) an organic aluminumoxy compound, and (b-3) a compound that reacts with the transition metal compound (a) to form an ion pair, as described in JP-A-2001-72706, JP-A-2002-332312, JP-A-2003-313247, JP-A-2004-107486, and JP-A-2004-107563. Herein, as the transition metal contained in the transition metal compound, the transition metal of Groups 3 to 11 in the periodic table can be used. Preferred catalysts to prepare the vinyl terminated ethylene macromonomer include those described in U.S. Pat. No. 7,795,347, specifically at column 16, line 56 et seq. in Formula (XI).

In another embodiment, the vinyl terminated macromonomer may be a vinyl terminated isotactic polypropylene or a vinyl terminated polyethylene as disclosed in U.S. Pat. Nos. 6,444,773; 6,555,635; 6,147,180; 6,660,809; 6,750,307; 6,774,191; 6,169,154; and EP 0 958 309, which are incorporated by reference herein.

In a preferred embodiment, any vinyl terminated macromonomer described herein can be fractionated or distilled by any means know in the art and one or more of the fractions may be used in the invention described herein. Preferred fractions typically have a narrow Mw/Mn, such as less than 1.5, preferably 1.4 or less, preferably 1.3 or less, preferably 1.2 or less. Alternately, the Mw/Mn is from 1 to 1.4, preferably 1.05 to 1.3, preferably 1.1 to 1.2.

In another embodiment of the invention, the fractions have a narrow boiling point range (as determined by ASTM D86) of less than 70° C., preferably less than 60° C., preferably less than 50° C., preferably less than 40° C., preferably less than 30° C., preferably less than 20° C., preferably less than 10° C.

In a preferred embodiment of the invention, the vinyl terminated macromonomer injected into a gas chromatograph column to determine the optimum cut points for the fractionation.

In a preferred embodiment, the fractions may be obtained by separation of the vinyl terminated macromonomer product such as by the processes described in GB 1550419A and U.S. Pat. Nos. 3,647,906 and 3,592,866. Useful fractions include ranges from about 4 carbon-numbers up to 20 carbon-numbers, e.g. $C_4$-$C_8$, $C_4$-$C_{14}$, $C_4$-$C_{20}$. The lower α-olefin fraction may contain α-olefins having the same carbon-number as the lowest α-olefin in the higher α-olefin fraction, but preferably contains only α-olefins of carbon-numbers lower than the carbon-number of the lowest α-olefin in the higher α-olefin fraction. The higher α-olefin fraction may include α-olefins of the same carbon number as the highest α-olefin in the lower α-olefin fraction up to the highest α-olefin produced in the reaction, but generally not higher than $C_{40}$. Preferably, however, the higher α-olefin fraction contains only α-olefins of carbon-numbers higher than the carbon number of the highest α-olefin in the lower α-olefin fraction.

In a separation where an α-olefin product mixture free of light oligomers, e.g., dimers, trimers, tetramers, etc., is desired, the lower α-olefin fraction is further separated into a light α-olefin fraction and an intermediate α-olefin fraction. The light α-olefin fraction may include from $C_4$ up to $C_{12}$, e.g., $C_4$-$C_6$, $C_4$-$C_8$, $C_4$-$C_{10}$, etc. In this modification, the intermediate α-olefin fraction is removed as product and the light α-olefin fraction is converted to additional intermediate α-olefins.

In another embodiment, any vinyl terminated macromonomer described herein can be separated into different boiling point cuts by distillation performed according to the procedures described in ASTM methods D2892 and D5236. (D2892: Standard Test Method for Distillation of Crude Petroleum (15-Theoretical Plate Column) and D5236: Standard Test Method for Distillation of Heavy Hydrocarbon Mixtures (Vacuum Potstill Method).)

For example, a low molecular weight atactic polypropylene VTM (677.3 gram charge) can be fractionated or distilled using the boiling point range, mass recovery, vacuum conditions listed below. Both initial boiling point (IBP) and final boiling point (FBP) are in degree Fahrenheit (° F.) and corrected to atmospheric pressure.

| Fraction (Cut) # | Initial boiling point/IBP (° F.) | Final boiling point/FBP (° F.) | Weight of collected fraction (grams) | Still pressure (mmHg) | ASTM method used |
|---|---|---|---|---|---|
| Charge (Feed) | — | — | 677.3 | | |
| 1 | IBP | 140 | 3.8 | 760 | D2892 |
| 2 | 140 | 160 | 11.9 | 760 | D2892 |
| 3 | 160 | 265 | 27.8 | 760 | D2892 |
| 4 | 265 | 365 | 35.0 | 88 | D2892 |
| 5 | 365 | 465 | 46.6 | 88 | D2892 |
| 6 | 465 | 525 | 34.4 | 88 | D2892 |
| 7 | 525 | 568 | 44.0 | 10 | D2892 |
| 8 | 568 | 588 | 14.2 | 10 | D2892 |
| 9 | 588 | 645 | 53.1 | 10 | D2892 |
| 10 | 645 | 700 | 63.4 | 2 | D2892 |
| 11 | 700 | 844 | 41.2 | 0.2 | D5236 |
| 12 | 844 | 892 | 42.3 | 0.2 | D5236 |
| 13 | 892 | 904 | 17.9 | 0.2 | D5236 |
| Distillation Bottoms | 904+ | — | 226.6 | — | — |

As shown in the table above, total recovery of collected fractions (fraction 1 to 13) with boiling points between about 75° F. and 904° F. was 435.6 g (64.3 wt % of initial charge). Total recovery of distillation bottoms with boiling point above 904° F. was 226.6 g (33.5 wt % of initial charge). The total recovery of both distilled fractions and bottoms material amounts to 97.8 wt %. The resulting distilled fractions and distillation bottoms have narrow molecular weight distributions (Mw/Mn<1.4) as determined by GPC.

In another embodiment of the invention, the vinyl terminated macromonomer (preferably a propylene based vinyl terminated macromonomer, preferably a homopolypropylene vinyl terminated macromonomer) has less than 1 mol % regio defects (as determined by $^{13}$C NMR), based upon the total propylene monomer. Three types of defects are defined to be the regio defects: 2,1-erythro, 2,1-threo, and 3,1-isomerization. The structures and peak assignments for these are given in L. Resconi, L. Cavallo, A. Fait, and F. Piemontesi, Chem. Rev. 2000, 100, pp. 1253-1345, as well as H. N. Cheng, Macromolecules, 17, p. 1950 (1984). Alternately, the vinyl terminated macromonomer (preferably a propylene based vinyl terminated macromer, preferably a homopolypropylene vinyl terminated macromonomer) has less than 250 regio defects per 10,000 monomer units (as determined by $^{13}$C NMR), preferably less than 150, preferably less than 100, preferably less than 50 regio defects per 10,000 monomer units. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
|---|---|
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, CH, CH$_2$), and multiplied by 10,000 to determine the defect concentration per 10,000 monomers.

In another embodiment, any vinyl terminated macromonomer described herein may have a melting point (DSC first melt) of from 60° C. to 160° C., alternately 50° C. to 145° C., alternately 50° C. to 130° C., alternately 50° C. to 100° C. In another embodiment, the vinyl terminated macromonomer described herein have no detectable melting point by DSC following storage at ambient temperature (23° C.) for at least 48 hours.

In another embodiment, the vinyl terminated macromonomer described herein may have a glass transition temperature of less than 0° C. or less (DSC), preferably −10° C. or less, more preferably −20° C. or less, more preferably −30° C. or less, more preferably −50° C. or less.

Melting temperature (T$_m$) and glass transition temperature (Tg) are measured using Differential Scanning Calorimetry (DSC) using commercially available equipment such as a TA Instruments 2920 DSC. Typically, 3 to 10 mg of the sample, that has been stored at 25° C. for at least 48 hours, is sealed in an aluminum pan and loaded into the instrument at 25° C. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the vinyl terminated macromonomers described herein are a liquid at 25° C.

In a particularly preferred embodiment of the invention, the vinyl terminated macromonomer (preferably comprising propylene, at least 50 mol % propylene, preferably at least 70 propylene) has less than 250 regio defects per 10,000 monomer units, preferably less than 150, preferably less than 100, preferably less than 50 regio defects per 10,000 monomer units and a Tg of less than 0° C. or less (DSC), preferably −10° C. or less, more preferably −20° C. or less, more preferably −30° C. or less, more preferably −50° C. or less.

In another embodiment, the vinyl terminated macromonomers described herein have a viscosity at 60° C. of greater than 1,000 cP, greater than 12,000 cP, or greater than 100,000 cP. In other embodiments, the vinyl terminated macromonomer have a viscosity of less than 200,000 cP, less than 150,000 cP, or less than 100,000 cP. Viscosity is defined as resistance to flow and the melt viscosity of neat copolymers is measured at elevated temperature using a Brookfield Digital Viscometer.

In another embodiment, the VTM described herein also has a viscosity (also referred to a Brookfield Viscosity or Melt Viscosity) of 90,000 mPa·sec or less at 190° C. (as measured by ASTM D 3236 at 190° C.; ASTM=American Society for Testing and Materials); or 80,000 mPa·sec or less, or 70,000 mPa·sec or less, or 60,000 mPa·sec or less, or 50,000 mPa·sec or less, or 40,000 mPa·sec or less, or 30,000 mPa·sec or less, or 20,000 mPa·sec or less, or 10,000 mPa·sec or less, or 8,000 mPa·sec or less, or 5,000 mPa·sec or less, or 4,000 mPa·sec or less, or 3,000 mPa·sec or less, or 1,500 mPa·sec or less, or between 250 and 6,000 mPa·sec, or between 500 and 5,500 mPa·sec, or between 500 and 3,000 mPa·sec, or between 500 and 1,500 mPa·sec, and/or a viscosity of 8,000 mPa·sec or less at 160° C. (as measured by ASTM D 3236 at 160° C.); or 7,000 mPa·sec or less, or 6,000 mPa·sec or less, or 5,000 mPa·sec or less, or 4,000 mPa·sec or less, or 3,000 mPa·sec or less, or 1,500 mPa·sec or less, or between 250 and 6,000 mPa·sec, or between 500 and 5,500 mPa·sec, or between 500 and 3,000 mPa·sec, or between 500 and 1,500 mPa·sec. In other embodiments the viscosity is 200,000 mPa·sec or less at 190° C., depending on the application. In other embodiments, the viscosity is 50,000 mPa·sec or less depending on the applications.

Process to Functionalize Polyolefins

This invention relates to a process to functionalize polyolefins comprising contacting, optionally, a catalyst, and one or more vinyl terminated macromonomers in the presence of a hydrosilation reagent.

The reactants are typically combined in a reaction vessel at a temperature of −50° C. to 300° C. (preferably 25° C., preferably 150° C.). Likewise the reactants are typically combined at a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 2 hours).

Typically, from about 5 to about 1 (e.g., 3 to 1), preferably from about 1.5 to about 1, and most preferably from about 1 to about 1 per equivalent of the sum of VTM and other reactive molecules (e.g., MeOH) to each available Si—H group.

Typically, from about $1\times10^{-2}$ to about $1\times10^{-7}$, preferably from about $5\times10^{-2}$ to about $1\times10^{-6}$, and most preferably from about $1\times10^{-3}$ to about $1\times10^{-5}$ moles of catalyst reagent are charged to the reactor per mole of VTM charged.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof such as can be found commercially (Isopar™); perhalogenated hydrocarbons such as perfluorinated $C_{4-10}$ alkanes, chlorobenzene, and aromatic and alkylsubstituted aromatic compounds such as benzene, toluene, mesitylene, and xylene. In a preferred embodiment, the feed concentration for the process is 60 vol % solvent or less, preferably 40 vol % or less, preferably 20 vol % or less.

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors, including continuous stirred tank reactors, batch reactors, reactive extruders, tubular reactors, pipes or pumps.

This invention further relates to a process, preferably an in-line process, preferably a continuous process, to produce functionalized polyolefins, comprising introducing macromonomer, hydrosilation reagent and a catalyst into a reactor, obtaining a reactor effluent containing hydrosilated terminated polyolefin, optionally removing (such as flashing off) solvent, unused monomer and/or other volatiles, obtaining hydrosilated terminated polyolefin (such as those described herein), preferably an in-line process, preferably a continuous process, to produce functionalized polyolefins, comprising introducing vinyl terminated polyolefin, catalyst (as described herein) and a hydrosilating compound (as described herein) into a reaction zone (such as a reactor, an extruder, a pipe and/or a pump) and obtaining functionalized polyolefin (such as those described herein).

For further information on hydrosilylation processes, catalysts, etc., please see Comprehensive Handbook on Hydrosilylation, B. Marciniec, ed. Pergamon, New York, 1992.

Hydrosilation Agents

Useful hydrosilaion agents include those represented by the formula:

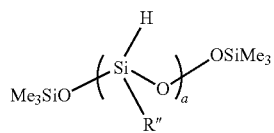

PHMS that have one or more reactive hydrogen atoms that can react with a terminal vinyl group, where "a" is an integer from 1 to about 1000, and R" is an alkyl or an aryl group such as methyl, hexyl, phenyl, fluoroalkanes, etc. or other copolymers containing PHMS units substituted through the polymeric backbone, preferably R" is $CH_3$.

Cyclic versions of hydrosilation agents are also included and can be represented by the formula:

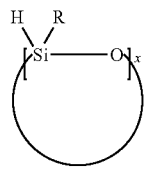

wherein x is from about 2 to about 40 SiO-groups/moities, e.g. a siloxane chain; and R is an alkyl or an aryl group, e.g., methyl, ethyl, propyl, pentyl, phenyl, anthracenyl, and the like.

Catalysts

Useful catalysts include Pt based materials having 0.1 to 10 wt % Pt-containing complexes in a suitable solvent. Actual amount in the reaction mixture is ppm (1-100 or more) chloroplatinic acid, $H_2PtCl_6$ and derivatives such as with tetramethyldisiloxane or other versions of Speirs catalyst, RhCl$(PPh_3)_3$, heterocarbene containing Pt complexes such as those found in Journal of Organometallic Chemistry 696 (2011) p. 2918, or supported/reclaimable catalysts such as Pt-nanoclusters (Macromolecules 2006, 39, pp. 2010-2012). Karstedt catalyst (typically a compound of platinum(0) and divinyltetramethyldisiloxane) is one example of a suitable platinum catalyst. It was found that similar zirconium based catalysts were not as effective as their platinum counterparts.

Organic peroxides can be used to further crosslink functionalized PMHS with other vinyl ended compounds.

Blends of Functionalized Polyolefins

In some embodiments, the functionalized (and optionally derivatized) polyolefins produced by this invention may be blended with from 0.5 wt % to 99 wt % (typically 1.0 wt % wt % to 98 wt %, and ideally about 50 wt % to about 98 wt %) of one or more other polymers, including but not limited to, thermoplastic polymer(s) and/or elastomer(s).

By thermoplastic polymer(s) is meant a polymer that can be melted by heat and then cooled without appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha-olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha-olefin, more preferably propylene and/or butene.

By elastomers is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SI, SIS, SB, SBS, SIBS, and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the functionalized (and optionally derivitized) polyolefins produced herein may further be combined with one or more of polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene. Preferred polymers include those available from ExxonMobil Chemical Company in Baytown, Texas under the tradenames EXCEED™ and EXACT™.

Tackifiers may be blended with the functionalized (and optionally derivitized) polyolefins produced herein and/or with blends of the functionalized (and optionally derivitized) polyolefins produced by this inventions (as described above).

Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In some embodiments the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %.

In another embodiment, the functionalized (and optionally derivitized) polyolefins of this invention, and/or blends thereof, further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives may be present in the typically effective amounts well known in the art, such as 0.001 wt % to 10 wt %. Preferred fillers, cavitating agents and/or nucleating agents include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or naphthenic oils such as Primol 352, or Primol 876 available from ExxonMobil Chemical France, S.A. in Paris, France. More preferred oils include aliphatic naphthenic oils, white oils or the like.

In a particularly preferred embodiment, the functionalized (and optionally derivitized) polyolefins produced herein are combined with polymers (elastomeric and/or thermoplastic) having functional groups such as unsaturated molecules-vinyl bonds, ketones or aldehydes under conditions such that they react. Reaction may be confirmed by an at least 20% (preferably at least 50%, preferably at least 100%) increase in Mw as compared to the Mw of the functionalized polyolefin prior to reaction. Such reaction conditions may be increased heat (for example, above the Tm of the functionalized polyolefin), increased shear (such as from a reactive extruder), presence or absence of solvent. Conditions useful for reaction include temperatures from 150° C. to 240° C. and where the components can be added to a stream comprising polymer and other species via a side arm extruder, gravimetric feeder, or liquids pump. Useful polymers having functional groups that can be reacted with the functionalized polyolefins produced herein include polyesters, polyvinyl acetates, nylons (polyamides), polybutadiene, nitrile rubber, hydroxylated nitrile rubber. In some embodiments, the functionalized (and optionally derivitized) polyolefin of this invention may be blended with up to 99 wt % (preferably up to 25 wt %, preferably up to 20 wt %, preferably up to 15 wt %, preferably up to 10 wt %, preferably up to 5 wt %), based upon the weight of the composition, of one or more additional polymers. Suitable polymers include those described as PM 1) to PM 7) in U.S. Pat. No. 8,003,725.

Applications

The functionalized VTMs of this invention (and blends thereof as described above) may be used in any known thermoplastic or elastomer application. Examples include uses in molded parts, films, tapes, sheets, tubing, hose, sheeting, wire and cable coating, adhesives, shoe soles, bumpers, gaskets, bellows, films, fibers, elastic fibers, nonwovens, spun bonds, corrosion protection coatings and sealants. Preferred uses include additives for lubricants and/or fuels.

In some embodiments, the functionalized vinyl terminated macromonomers produced herein are further functionalized (derivitized), such as described in U.S. Pat. No. 6,022,929; A. Toyota, T. Tsutsui, and N. Kashiwa, 48 POLYMER BULLETIN 213-219 (2002); 112 J. AM. CHEM. SOC. 7433-7434 (1990); and WO 2009/155472.

The functionalized vinyl terminated materials prepared herein may be used in oil additivation, lubricants, fuels and many other applications. Preferred uses include additives for lubricants and or fuels.

In particular embodiments herein, the vinyl terminated macromonomers disclosed herein, or functionalized/derivitized analogs thereof, are useful as additives, preferably in a lubricant.

The functionalized VTM's and/or derivitized VTM's produced herein have uses as lubricating additives which can act as dispersants, viscosity index improvers, or multifunctional viscosity index improvers. Additionally they may be used as disinfectants (functionalized amines) and or wetting agents.

Functionalized VTMs and/or derivitized VTMs having uses as dispersants typically have Mn's g/mol) of less than 20,000, preferably less than 10,000 and most preferably less than 8,000 and typically can range from 500 to 10,000 (e.g. 500 to 5,000), preferably from 1,000 to 8,000 (e.g. 1,000 to 5,000) and most preferably from 1,500 to 6,000 (e.g. 1,500 to 3,000).

The functionalized VTMs and/or derivitized VTMs described herein having Mn's (g/mol) of greater than 10,000 g/mol, preferably greater than 10,000 to 100,000 g/mol (preferably 20,000 to 60,000 g/mol) are useful for viscosity index improvers for lubricating oil compositions, adhesive additives, antifogging and wetting agents, ink and paint adhesion promoters, coatings, tackifiers and sealants, and the like. In addition, such VTMs may be functionalized and derivitized to make multifunctional viscosity index improvers which also possess dispersant properties. (For more information please see U.S. Pat. No. 6,022,929.)

The functionalized VTMs and/or derivitized VTMs described herein may be combined with other additives (such as viscosity index improvers, corrosion inhibitor, oxidation inhibitor, dispersant, lube oil flow improver, detergents, demulsifiers, rust inhibitors, pour point depressant, antifoaming agents, antiwear agents, seal swellant, friction modifiers, and the like (described for example in U.S. Pat. No. 6,022,929 at columns 60, line 42 to column 78, line 54 and the references cited therein) to form compositions for many applications, including but not limited to lube oil additive packages, lube oils, and the like.

Compositions containing these additives are typically are blended into a base oil in amounts which are effective to provide their normal attendant function. Representative effective amounts of such additives are illustrated as follows:

| Compositions | (Typical) wt %* | (Preferred) wt %* |
|---|---|---|
| V.I. Improver | 1-12 | 1-4 |
| Corrosion Inhibitor | 0.01-3 | 0.01-1.5 |
| Oxidation Inhibitor | 0.01-5 | 0.01-1.5 |
| Dispersant | 0.1-10 | 0.1-5 |
| Lube Oil Flow Improver | 0.01-2 | 0.01-1.5 |

-continued

| Compositions | (Typical) wt %* | (Preferred) wt %* |
|---|---|---|
| Detergents and Rust inhibitors | 0.01-6 | 0.01-3 |
| Pour Point Depressant | 0.01-1.5 | 0.01-1.5 |
| Anti-Foaming Agents | 0.001-0.1 | 0.001-0.01 |
| Antiwear Agents | 0.001-5 | 0.001-1.5 |
| Seal Swellant | 0.1-8 | 0.1-4 |
| Friction Modifiers | 0.01-3 | 0.01-1.5 |
| Lubricating Base Oil | Balance | Balance |

*Wt %'s are based on active ingredient content of the additive, and/or upon the total weight of any additive-package, or formulation which will be the sum of the A.I. weight of each additive plus the weight of total oil or diluent.

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The subject functionalized or derivitized VTMs of the present invention can be added to small amounts of base oil or other compatible solvents along with other desirable additives to form additive-packages containing active ingredients in collective amounts of typically from about 2.5% to about 90%, and preferably from about 15% to about 75%, and most preferably from about 25% to about 60% by weight additives in the appropriate proportions with the remainder being base oil.

The final formulations may employ typically about 10 wt % of the additive-package with the remainder being base oil.

In another embodiment, the vinyl terminated polyolefins described herein can be used in any process, blend or product disclosed in WO 2009/155472 or U.S. Pat. No. 6,022,929, which are incorporated by reference herein.

In a preferred embodiment, this invention relates to a fuel comprising any VTM produced herein. In a preferred embodiment, this invention relates to a lubricant comprising any VTM produced herein.

Depending on functionalization, the polymers described herein are useful as plasticisers, surface-modifiers, surfactants, wetting agents, in ink formulations, lubricants, oil well defoamers, water-proofing agents, sealants. Highly alkylated PMHS materials could also be useful as viscosity modifiers. PMHS materials alkylated with different PO-VTMs could be useful as compatabilizers. If reactive Si—H groups remain these materials would be useful as cross-linking reagents with other vinyl-containing materials such as vinyl silanes, 1,2-butadiene polymers and copolymers, OH-containing materials and polymers.

EXPERIMENTAL

Product Characterization

Products were characterized by $^1$H NMR and $^{13}$C NMR as follows:

$^1$H NMR

Unless otherwise stated, $^1$H NMR data was collected at either 25° C. or 120° C. (for purposes of the claims, 120° C. shall be used) in a 5 mm probe using a spectrometer with a 1H frequency of at least 400 MHz. Data was recorded using a maximum pulse width of 45° and either a 1 or 2 second delay between pulses. Typical NMR solvents such as $CDCl_3$, $CD_2Cl_2$, or $C_6D_6$ were purchased from Cambridge Isotope Laboratories and were used at ambient temperatures in collection of the NMR data.

$^{13}$C NMR

Unless otherwise stated, $^{13}$C NMR data was collected at 120° C. using a spectrometer with a $^{13}$C frequency of at least 100 MHz. A 90 degree pulse, an acquisition time adjusted to give a digital resolution between 0.1 and 0.12 Hz, at least a 2 second pulse acquisition delay time with continuous broadband proton decoupling using swept square wave modulation without gating was employed during the entire acquisition period. The spectra were acquired with time averaging to provide a signal to noise level adequate to measure the signals of interest. Samples were dissolved in tetrachloroethane-$d_2$ (TCE) for high temperature measurements. Other solvents such as $CDCl_3$, $CD_2Cl_2$, or $C_6D_6$ were used at ambient temperatures.

$^{29}$Si NMR $^{29}$Si spectra were taken at 99.4 MHz using the standard Bruker $^{29}$Si program and a delay time of 60 seconds between pulses. $^{29}$Si NMR spectra were referenced to tetramethylsilane at 0 ppm. Molecular weights of products were determined by GPC-MALLS/3D analysis or by GPC-DRI analysis with polystyrene standards. MH coefficients used were based on the polyolefin macromere or that employed in the hydrosilation reaction. Molecular weights of VTM's were determined by both $^1$H NMR and by GPC-DRI analysis. The mass recovered was always greater than 95% unless stated otherwise. TGAs were measured on a Universal V4.7A TA Instrument with heating rate at 10° C./min, balance of 10 mL/min $N_2$, purge 25 mL/min $N_2$, and a range from 30° C. to 500° C. DSCs were also measured on a Universal V4.7A TA Instrument from −170° C. to 30° C. The sample was equilibrated at −170° C. for 5 minutes then heated at a rate of 10° C. per minute to 30° C. and held for 2 minutes.

Hydrosilation Reactions of VTM's (Vinyl Terminated Macromonomers) with PMHS (Polymethylhydrosiloxane)

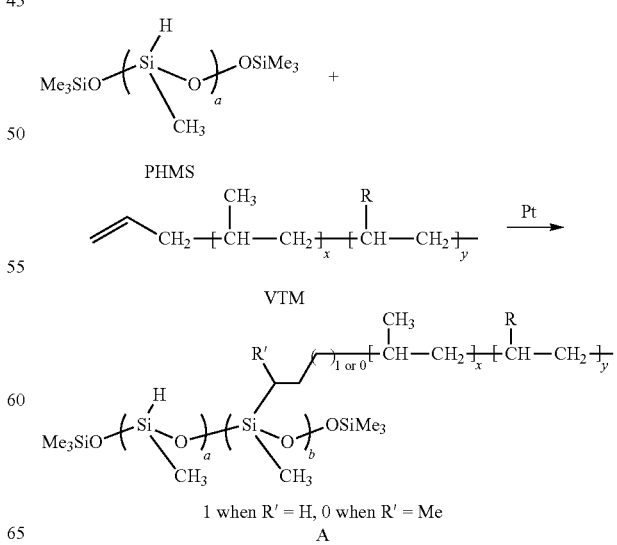

Scheme 1.

A 1 when R' = H, 0 when R' = Me

Experimental

Vinyl Terminated Monomacromers (Table 1) were made according to the processes described in U.S. Pat. No. 8,318,998 and/or U.S. Pat. No. 8,455,597, which are incorporated by reference herein. Macromer D was similarly synthesized using the catalyst system composed of a 1 to 1 molar amount of $(CpHMe_4)(CpH_4n\text{-propyl})ZrMe_2$ and dimethylanilinium tetrakisperfluoronaphthylborate. Octene and eicosine were purchased from Aldrich Chemical and dried with 3A sieves prior to use.

PMHS materials of 390 g/mol and 1700 to 2300 g/mol were purchased from Aldrich and dried over 3 A sieves. Methylhydrocyclosiloxane with Mn of 180 to 360 g/mol was purchased from Gelest and dried over 3 A sieves. Kardstedt catalyst was purchased from Gelest as a 2 wt % solution of Platinum-divinyltetramethyldisiloxane complex in xylenes and used without further purification. Anhydrous solvents such as toluene were purchased from Aldrich and dried over 3 A sieves. Dimethylanilinium tetrakisperfluoronaphthylborate was purchased from Grace-Davison. $(CpHMe_4)(CpH_4n\text{-propyl})ZrMe_2$ was purchased from Boulder.

TABLE 1

Vinyl Terminated Monomacromers

| VTM Macromer | Composition | % Vinyl Chain ends | % Vinylidene Chain Ends | Mn, $^1$H NMR, g/mol | Mn, GPC-DRI, g/mol | Mw/Mn GPC/GPC |
|---|---|---|---|---|---|---|
| A | $C_3$ | 95 | 5 | 1700 | | |
| B | $C_3$ | 98 | 2 | 2789 | 2558 | 2.5 |
| C | $C_3$ | 97 | 3 | 2100 | | |
| D | $C_3$ | 5 | 95 | 2000 | | |
| E | $C_3C_4$, 45% $C_4$ | 95 | 5 | 2200 | 1941 | 2.6 |
| F | $C_3C_4$, 46% $C_4$ | 85 | 9 | 15,400 | 14,400 | 2.3 |
| G | octene | 100 | 0 | 112 | | |
| H | $C_2C_3$, 17% $C_2$ | 76 | 23 | 7876 | 7274 | 2.7 |
| I | $C_3$ | 98 | 2 | 416[i] | | 1.02 |
| J | $C_2C_3$, 53% $C_2$ | 99 | 1 | 1004 | | |
| K | $C_3$ | 97 | 3 | 4844 | 4906 | 2.6 |

[1] Mn determined by GPC-DRI at 40° C. in THF

TABLE 2

PMHS Materials

| Source | PMHS | Mn (g/mol) |
|---|---|---|
| Aldrich | X | 1700 to 2300 |
| Aldrich | Y | 390 |

Examples 1-16

Standard Hydrosilation Reaction

Reactions were performed in a vacuum atmospheres drybox with continuous $N_2$ purge. The VTM was dissolved in toluene (generally 60 to 150 mls) and 3A sieves (2-5 g) were added for removal of water. After at least 48 hrs, the mixture was decanted from the sieves, with the aid of additional toluene, into another glass vessel with a teflon stir bar. PMHS was added with vigorous stirring and a t=0 aliquot pulled for reference. The reaction mixture if heated was brought to desired reaction temperature at this point. Karstedt catalyst was added and the reaction stirred for 3 hrs unless stated otherwise. An aliquot was taken before the reaction mixture was transferred from the drybox to the atmosphere into a hood. The reaction was generally reacted with MeOH for 2 hrs or exposed to air for 2 hrs before product work-up. The volatiles were removed and the product dried in a vacuum oven at 100° C. to remove all toluene. The products were generally light to medium yellow clear viscous materials that were soluble in hydrocarbons.

Temperature and Oxygen Effects on Hydrosilation Reactions

| Example | VTM, g | PMHS, g | Karstedt, mg | Temp, °C. | Rxn. Time in Drybox, hrs | Conversion under N2 | Rxn. Time in Air, minutes | Conversion after air |
|---|---|---|---|---|---|---|---|---|
| 1 | C, 18.3 | X, 0.55 | 60 | 110 | 2 | 0 | na | na |
| 2 | C, 7.8 | X, 0.9 | 50 at t = 0 hrs, additional 50 at t = 2 hrs | 60 | 4 | 44% at 2 hrs, 44% at 4 hrs | na | na |
| 3 | C, 8.9 | X, 1.0 | 50 at t = 0 hrs, additional 40 at t = 50 hrs | 30 | 52 | 77% at 2 hrs, 78% at 48 hrs, 83% at 51 hrs | 10 | 100 |
| 4 | C, 8.4 | X, 0.4 | 40 | 30 | 0.1 | na | 30 | 100 |

Product Characterization

| Example | $Mn^a$ | Mw | Mz | $g'_{vis}$ | g'(z avg) | % Isomerized vinylene | % Unreacted vinyls |
|---|---|---|---|---|---|---|---|
| 3 | 159.2 | 1693 | 8011 | 0.045 | 0.018 | 0 | 0 |
| 4 | 48.4 | 185.2 | 522.6 | 0.166 | 0.091 | 17.8 | 0 |

$^a$GPC values are from MALLS/3D analysis and are in Kg/mol

FIG. 1 provides the following: 1 is Aldrich PMHS X, 2 is Alkylated PMHS before methanolysis, 3 is final product. All from Example 9, $^{29}$Si NMR, $C_6D_6$, RT, 99.4 MHz.

Figure 2:
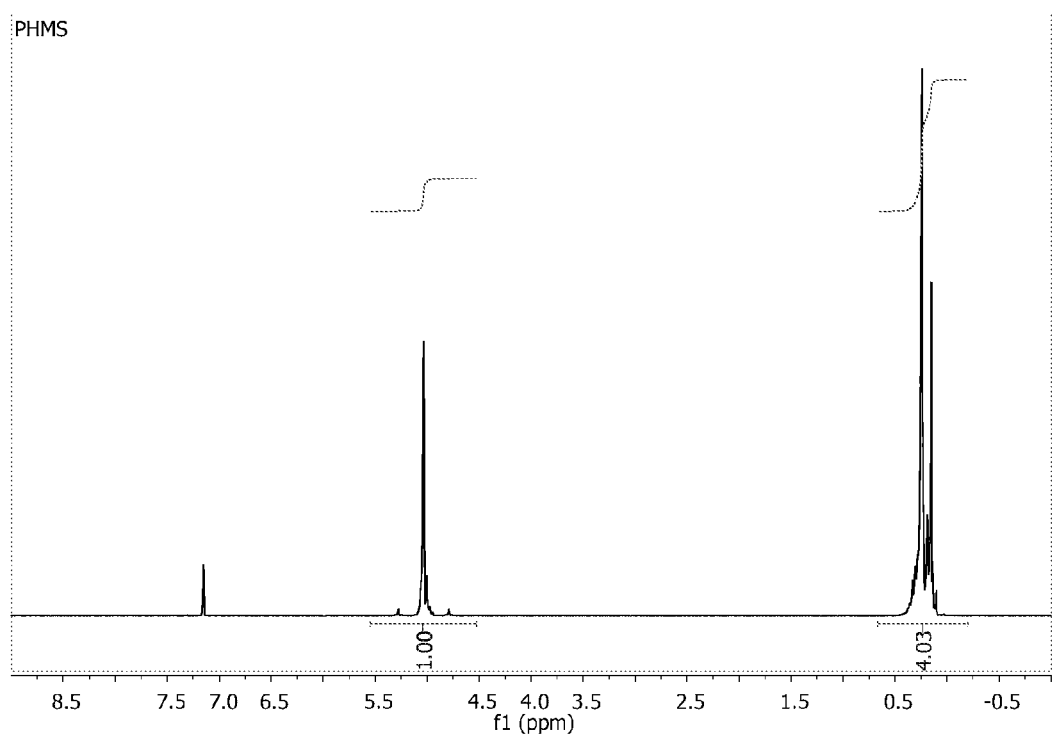
FIG. 2 is a $^1$H NMR of PMHS X, $C_6D_6$, RT, 500 MHz.

FIG. 2 provides an $^1$H NMR spectra of PHMS X.

Figure 3:
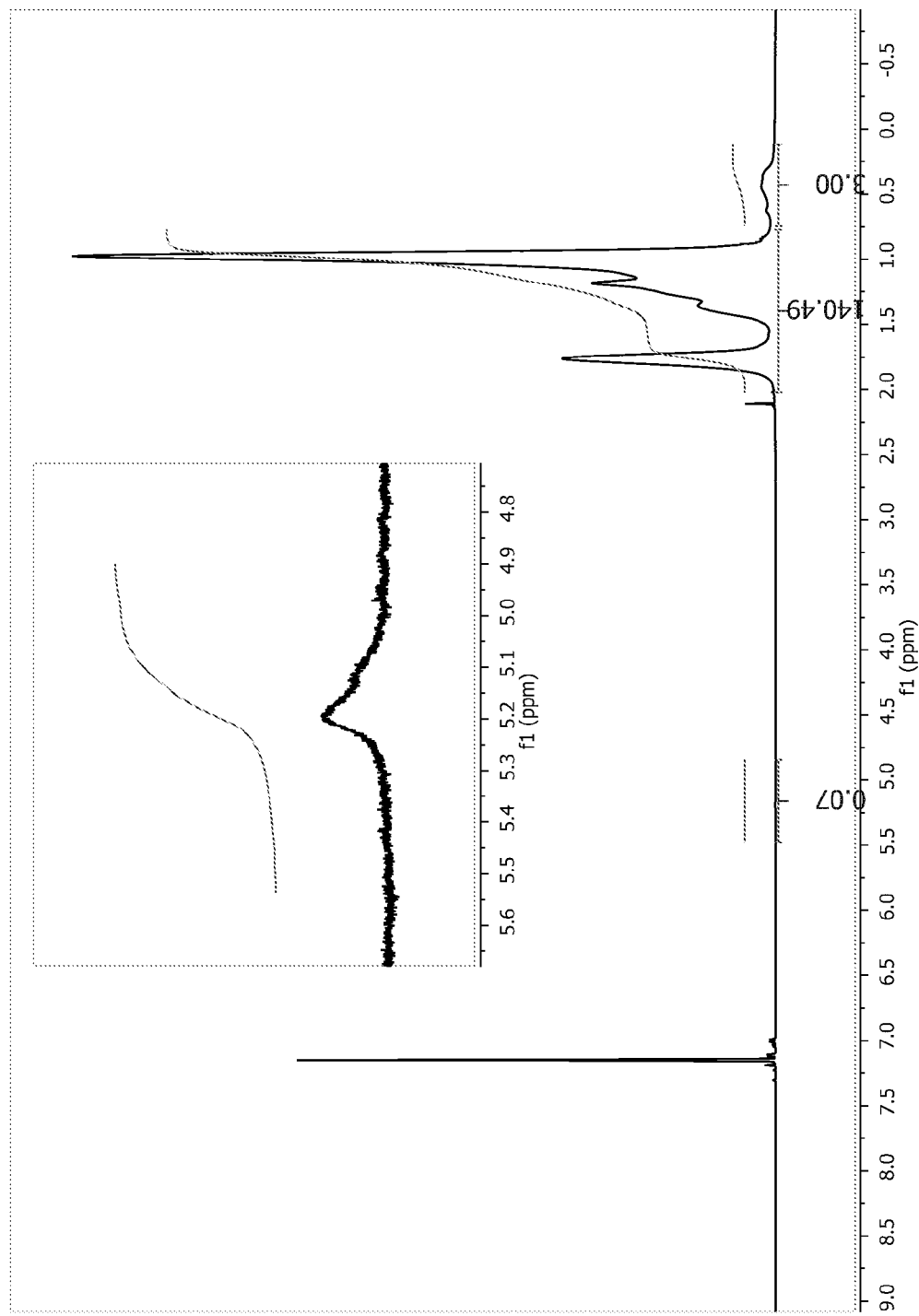
FIG. 3 is a $^1$H NMR of Example 3 Product, $C_6D_6$, RT, 500 MHz.
Figure 4:
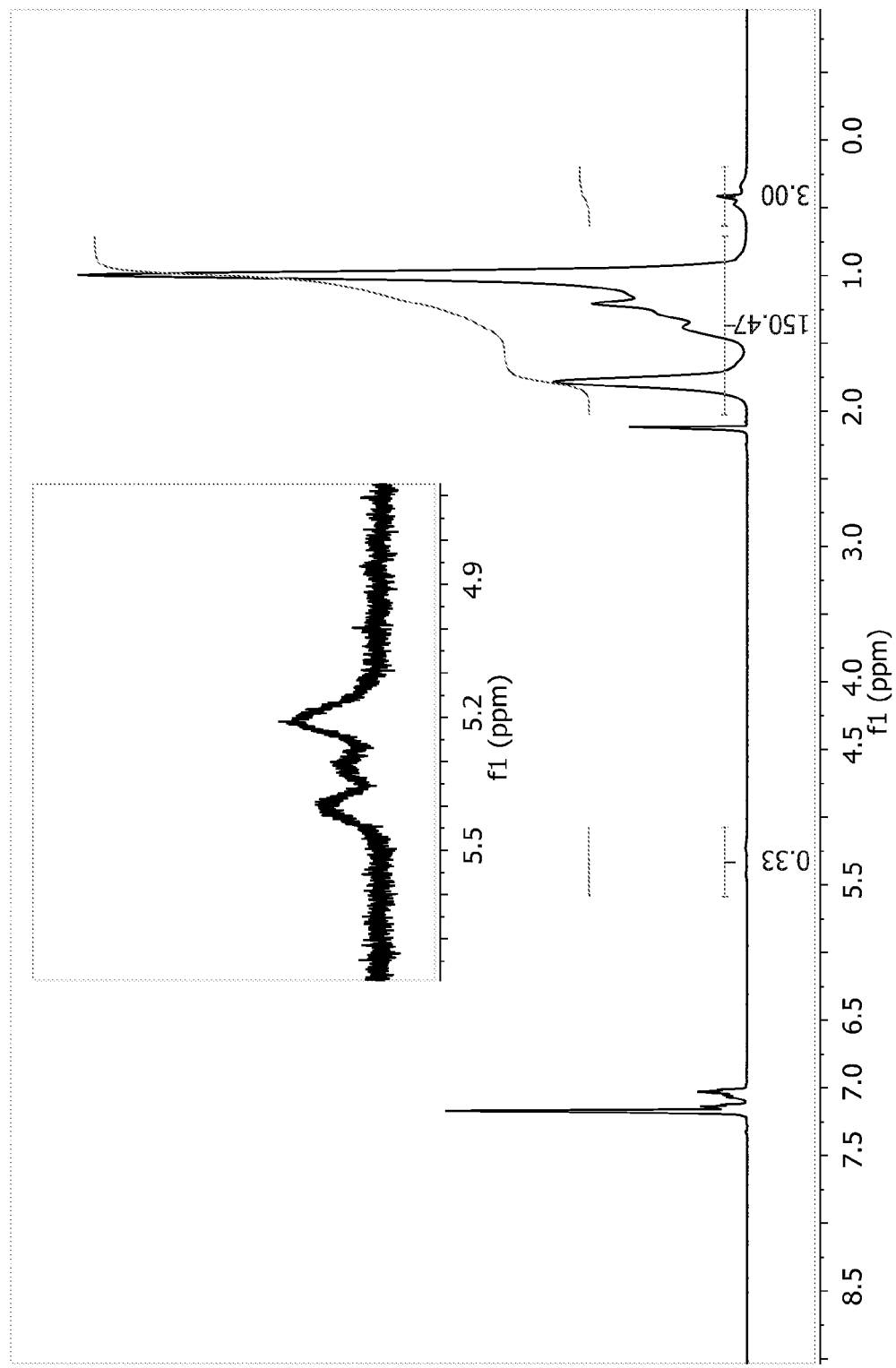
FIG. 4 is a $^1$H NMR of Example 4 Product, $C_6D_6$, 500 MHz.

FIG. 3 provides an $^1$H NMR spectra of Example 3.

FIG. 3 provides an $^1$H NMR spectra of Example 4.

Alkylation Followed by Methanolysis; 1 Pot Reaction

Any unreacted Si—H groups remaining after alkylation can be potentially transformed into other functionalities. Not only would this introduce a second or third functionality but also help preserve the linearity of the original PMHS backbone. Methanolysis of the intermediate A by reaction with methanol is easily carried out in a one pot reaction. First hydrosilation of aPP-VTM with PHMS is performed in the drybox followed by addition of MeOH immediately after the reaction is brought outside the drybox. The reaction is indicated by Scheme 3.

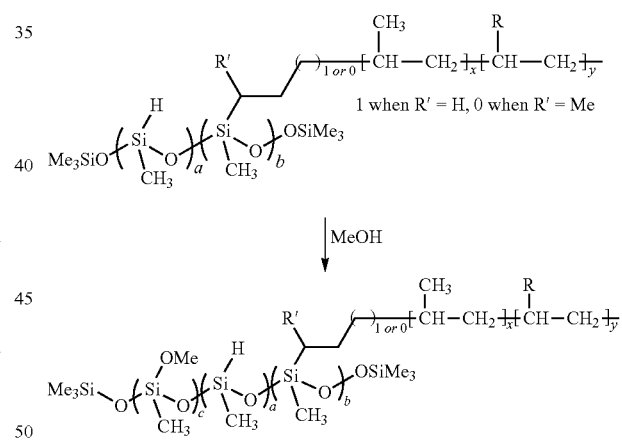

Scheme 3. Methanolysis Alkylation Followed by Methanolysis Examples

| Example | VTM, g | PMHS, g | Toluene, mls | Karstedt, mg | MeOH, mls | VTM/PMHS mol/mol | $Mn^a$ | Mw | Mz | $g'_{vis}$ | g'(z avg) |
|---|---|---|---|---|---|---|---|---|---|---|---|
| 5 | C, 8.5 | Y, .55 | 60 | 60 | 3 | 2.8 | 6.7 | 11.3 | 17 | 0.731 | 0.668 |
| 6 | B, 75 | Y, 3.2 | 150 | 90 | 0 | 3.3 | 7.6 | 13.8 | 21.3 | 0.691 | 0.639 |
| 7 | E, 76 | Y, 4.5 | 120 | 70 | 0 | 3 | 3.3 | 6.4 | 12.4 | 0.631 | 0.595 |
| 8 | F, 86 | Y, 0.8 | 200 | 70 | 0 | 2.7 | 35 | 77.4 | 135.3 | 0.698 | 0.601 |
| 9 | C, 7.7 | X, 0.8 | 60 | 105 | 3 | 9.2 | 41.7 | 126.5 | 701.8 | 0.209 | 0.081 |
| Comp. Ex 1 | D, 7.8 | X, 0.7 | 70 | 105 | 0 | 11.1 | 19 | 95.6 | 209.7 | 0.218 | 0.132 |
| 10 | B, 74 | X, 2.5 | 100 | 80 | 20 | 21.2 | 41.8 | 172.5 | 445.5 | 0.189 | 0.111 |
| 11 | E, 81 | X, 3.7 | 150 | 80 | 30 | 19.9 | 5.3 | 37.3 | 225.5 | 0.302 | 0.129 |
| 12 | F, 69 | X, 2.1 | 200 | 100 | 30 | 4.3 | 85.3 | 228.7 | 602.4 | .41 | 0.262 |
| 13 | A, 63 | X, 3.7 | 100 | 80 | 40 | 20 | 24.9 | 91.7 | 229.1 | .261 | 0.166 |
| 14 | G, 5.3 | X, 3.0 | 40 | 60 | 0 | 31.5 | | | | | |

-continued

| Example | VTM, g | PMHS, g | Toluene, mls | Karstedt, mg | MeOH, mls | VTM/PMHS mol/mol | Mn[a] | Mw | Mz | g'$_{vis}$ | g'(z avg) |
|---|---|---|---|---|---|---|---|---|---|---|---|
| 15 | H, 63 | X, 0.8 | 80 | 60 | 10 | 20 | 29.0 | 194.8 | 596.3 | .382 | 0.227 |
| 16 | I, 5.3 | X, 1.2 | 30 | 30 | 2 | 21 | 11.8 | 52.1 | 205.5 | 0.138 | 0.087 |

[a]GPC values are from MALLS/3D analysis and are in Kg/mol $^1$H NMR Characterization of Alkylation Followed by Methanolysis Examples
$^1$H NMR: Integration values of proton regions

| Example | 5.3 to 5.0, ppm | 3.9 to 3.3, ppm | 2.0 to 0.7, ppm | 0.6 to 0.0, ppm | Vinylene | Vinyl | Vinylidene |
|---|---|---|---|---|---|---|---|
| 5 | 0.92 | 0 | 829 | 30 | .05 | 0 | 0 |
| 6 | .94 | 0 | 1330.9 | 30 | 0.33 | 0 | .02 |
| 7 | 0 | 0 | 911.3 | 30 | .66 | 1.2 | .47 |
| 8 | 1.98 | 0 | 2158.9 | 30 | 0.65 | 0 | 0 |
| 9 | 2.3 | 33.2 | 2383.1 | 108 | 0 | 0 | 0.3 |
| Comp. Ex 1 | 13.1 | 0.6 | 2881.2 | 108 | 0 | 0 | 2.0 |
| 10 | 2.7 | 5.0 | 7560 | 108 | 0 | .4 | 0 |
| 11 | 5.5 | 0 | 5057.3 | 108 | 9.1 | 0 | 0 |
| 12 | 0.6 | 39.0 | 12,016 | 108 | 0 | 0 | 0 |
| 13 | 5.1 | 15.2 | 3838.5 | 108 | 0 | 0 | 0.1 |
| 14 | .1 | 0 | 454.9 | 108 | 0 | 0 | 0 |
| 15 | 2.2 | 22.9 | 24,578.8 | 108 | 3.3 | 1.5 | 1.9 |
| 16 | 4.0 | 0.6 | 1293.4 | 108 | 0 | 0 | 0 |

Thermal Analysis and DSC

| Example | Tg, °C. | 1% Mass Loss, °C. | 50% Mass Loss, °C. | Total Mass Loss, % |
|---|---|---|---|---|
| 6 | −18.1 | 327.6 | 446.5 | 98.9 |
| 7 | −41.5 | 202.3 | 431.7 | 98.6 |
| 9 | −16.1 | 363.3 | 451.4 | 99.6 |
| 10 | −15.8 | 326.3 | 443.7 | 96.6 |
| 11 | −37.7 | 244.4 | 440.2 | 96.6 |

Viscometer Instrumentation

Dynamic viscosity and density of a blend of functionalized polysiloxane and poly(alpha)olefin (PAO) base oil were measured on a Stabinger Viscometer (Model SVM 3000 manufactured by Anton Paar) at both 40° C. and 100° C. The kinematic viscosity and viscosity index (VI) were calculated from the dynamic viscosity and density determined at these two temperatures.

Preparation of Blend for Viscosity Measurement

A 1 wt % of functionalized polysiloxane in 4 cSt poly(alpha)olefin (PAO4) base oil available from ExxonMobil Chemical Company in Houston Tex. under the Tradename SpectraSyn™ 4 was prepared dissolving 1 part by weight of functionalized polysiloxane in 99 parts by weight of PAO4. The blend was warmed to about 50° C. to 60° C. for 15 to 30 minutes until a clear solution was obtained.

Viscosity and viscosity index (VI)

| Example | Wt % in PAO4 | Kv 40° C. (mm$^2$/s) | Kv 100° C. (mm$^2$/s) | Viscosity Index |
|---|---|---|---|---|
| 7 | 1 | 19.5 | 4.31 | 130.9 |
| 10 | 1 | 21.1 | 4.62 | 140.3 |
| 9 | 1 | 24.1 | 5.22 | 154.7 |
| 6 | 1 | 20.6 | 4.50 | 135.6 |
| 11 | 1 | 19.7 | 4.36 | 133.3 |
| 12 | 1 | 24.9 | 5.40 | 159.5 |
| PAO4 | neat | 18.4 | 4.11 | 126.3 |

FIG. 1 is the overlay of three $^{29}$Si NMR spectra from Example 9. Spectrum 1 is Aldrich PMHS X, 2 is Alkylated PMHS before methanolysis, and 3 is final product.

The amount of O—SiR(Me)-O (alkylated PMHS) to O—SiH(Me)-O (unreacted PMHS) where R is from the VTM is determined by the integration of the $^{29}$Si NMR spectrum. The region from −30 to −35 ppm is due to the O—SiH(Me)-O. The region from −17 to −23 ppm is due to O—SiR(Me)-O. Where there was further reaction with MeOH, then the region from −52 to −60 ppm is due to O—Si(OMe)(Me)-O. Usually apparent in the linear PMHS materials are the smaller resonances from 10 to 13 ppm are due to the Me3Si—O termini which can be normalized to 2. The resonances around −67 ppm are unidentified but may be due to dehydrogenative coupling of PMHS chains to form —OSiO(Me)O— units.

Additional Hydrosilation Reactions

Use of dry air sparge to react all (or most) of vinyl chain ends-improved the alkylation.

Example 17

Reaction of EP-VTM H with Methylhydrocyclosiloxane

EP-VTM H (9.0 g,) was dissolved in toluene (125 ml) and dried over 3 A sieves for 48 hrs. The reaction mixture was decanted away from the mole sieves and methylhydrocyclosiloxane (100 mg) was added with vigorous stirring under an N$_2$ atmosphere. Kardstedt catalyst (40 mg of 2 wt % solution) was next added to the reaction mixture. An aliquot at 2 hrs indicated that only 25% of the vinyl chain ends had been consumed. The reaction was taken out of the drybox and the reaction was sparged with dry air for 2 hrs. An analysis of an aliquot by $^1$H NMR indicated all vinyl chain ends had been consumed. The volatiles were removed and the product dried in a vacuum oven at 80° C. for 14 hrs (8.9 g). $^1$H NMR (500 MHz, C$_6$D$_6$) d ppm; 2.0 to 0.6 (m, 3890.5H), 0.6 to 0 (m, 12H). GPC-3D; Mn=40.4 Kg/mol, Mw=162.2 Kg/mol, Mz=514.1 Kg/mol, g'$_{vis}$=0.517, g'(Z av)=0.33. $^{29}$Si NMR (C$_6$D$_6$, 79.5 MHz) δ ppm; −17 to −26 (m, O—SiR(Me)-0, 1.0 Si), −27 to −35 (m, O—SiH(Me)-O, 0.03 Si).

Example 18

Reaction of iPP-VTM with PMHS at Ambient Temperature iPP-VTM monomacromer L synthesis: A 2 L autoclave was filled with 0.5 ml triisobutylaluminum (1 M in hexanes), 200 ml propylene and 800 ml isohexanes. The reactor contents were heated to 85° C. and stirring speed set to 750 rpms. A catalyst solution of rac-dimethylsilyl(2-methylindenyl)$_2$ ZrMe$_2$ (3 mg) and dimethylaniliniumperfluoronapthylborate (6.3 mg) in toluene (5 ml) was added by catalyst bomb with the aid of N$_2$. After 17 minutes, the reactor contents were cooled, depressurized and the solid polymer collected. The product was dried in a vacuum oven for 12 hrs at 70° C. (68 g). GPC-DRI; Mn=12.8 Kg/mol, Mw=27.0 Kg/mol, PD=2.12, g'$_{vis}$=0.930. Mn by $^1$H NMR=10.3 Kg/mol. Vinyls=95%.

iPP-VTM L (21.2 g) was slurried in toluene (200 ml). PMHS X (0.65 g) was added to the reaction mixture. Dry air was continuously bubbled through the reaction mixture. Karsted catalyst (90 mg) was added and an aliquot was withdrawn at 1.5 hrs and analysis by $^1$H NMR indicated all vinyl chain ends had been consumed. After 3 hrs, EP-VTM J (19.5 g,) was added and the reaction mixture stirred overnight with the dry air sparge. The reaction mixture was filtered and washed with hexane (3×200 ml) and dried in a vacuum oven at 80° C. (30.5 g). The $^1$H NMR (380 K, C$_2$D$_2$Cl$_4$) spectrum of the reaction product indicated vinyl groups were present from excess EP macromer not separated by hexane washings. The Si—H region was unchanged in comparison to the 1.5 hr aliquot and remained at 55% compared to PMHS starting material. GPC-DRI; Mn=11.4 Kg/mol; Mw=34.5 Kg/mol; Mw/Mn=3.0; g'$_{vis}$=0.874. This shows that very little iPP or EP macromer was hydrosilated.

Example 19

Improved Synthesis of Crystalline VTM with PMHS: Reaction of iPP-VTM with PMHS at 100° C.)/Blocky Composition iPP-VTM macromonomer M synthesis: A 2 L autoclave was filled with 0.5 ml Triisobutylaluminum (1 M in hexanes), 400 ml propylene and 600 ml isohexanes. The reactor contents were heated to 100° C. and stirring speed set to 750 rpms. A catalyst solution of rac-C$_2$H$_4$(4-methylindenyl)$_2$ HfMe$_2$ (3.5 mg) and dimethylanilinium-perfluoronapthylborate (7 mg) in toluene (5 ml) was added by catalyst bomb with the aid of N$_2$. After 20 minutes, the reactor contents were cooled, depressurized and the solid polymer collected. The product was dried in a vacuum oven for 12 hrs at 70° C. (84 g). GPC-DRI; Mn=6.3 Kg/mol; Mw=13.9 Kg/mol; Mw/Mn=2.2; g'$_{vis}$=0.979. Mn=7.0 Kg/mol by $^1$H NMR. Vinyls=87.7%, Vinylidenes=7.5%. DSC; $2^{nd}$ melt=114.3 (d H=37.7 J/g), sh at 117° C., cryst=81.1, 92.1° C.

iPP-VTM M (12.5 g) was slurried in toluene (125 ml). PMHS X (2.1 g) was added to the reaction mixture. The reaction mixture was sparged with dry air and heated to 100° C. Kardsted catalyst (50 mg) was added and an aliquot withdrawn at 10 minutes. After 15 minutes, EP-VTM (6.5 g, 26826-81-6, J) was added and an aliquot withdrawn at 1 hr total reaction time. After 1 hr, octene (20 ml) was added and the reaction cooled after 1.5 hrs. Analysis of each aliquot at 10 minutes, 1 hr, and 1.5 hrs indicated no vinyl chain ends remained and the Si—H region decreasing concomittingly. The final Si—H content was 8.9% compared to the original PMHS starting material. GPC-3D; Mn=22.1 Kg/mol; Mw=89.7 Kg/mol; Mz=780.2 Kg/mol; g'$_{vis}$=0.414. DSC; $2^{nd}$ melt=124.7° C. (d H=47.1 J/g); cryst.=95.9° C.

Example 20

Reaction of aPP-VTM K with PMHS Y aPP-VTM H (32.5 g.) was dissolved in toluene (125 ml) and dried over 3 A sieves. After decanting the solution, PMHS y (0.75 g.) was added and the reaction mixture was sparged with dry air. Kardstedt catalyst (60 mg) was added and the reaction mixture was stirred and sparged for 12 hrs. The volatiles were removed and the product dried in a vacuum oven at 80° C. for 4 days (32.8 g). $^{29}$Si NMR (C$_6$D$_6$, 79.5 MHz) δ ppm; 13 to 10 (m, —OSiMe3, 2 Si), −17 to −26 (m, O—SiR(Me)-O, 3.7 Si), −27 to −35 (m, O—SiH(Me)-O, 0.4 Si).

Comparative Example 2

Attempted Hydrosilation of Eicosene with PMHS Catalyzed by Cp$_2$ZrCl$_2$/nBuLi

Cp$_2$ZrCl$_2$ (62 mg, 0.21 mmol) in 10 mls of toluene was cooled to −30° C. nBuLi (0.3 mls, 0.42 mmol, 1.6M in hexanes) was added to the reaction mixture and the mixture warmed to 0° C. In a separate glass vessel, PMHS Y (1.00 g, 2.5 mmol,) was dissolved in 10 mls toluene and was mixed with 1-eicosene (3.5 g, 12.5 mmol), dissolved in toluene (30 ml). Catalyst solution (2 ml) was added to the eicosine/PMHS reaction mixture. The reaction mixture was heated to 90° C. and an aliquot taken at 1.5 hr. Analysis by $^1$H NMR indicated>95% vinyl chain ends remained. The reaction was continued at 90° C. and monitored periodically at 3.5, 19, and 56 hrs. Analysis by $^1$H NMR indicated that in all samples >95% vinyl chain ends remained.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Thus, the term "comprising" encompasses the terms "consisting essentially of," "is," and "consisting of" and anyplace "comprising" is used "consisting essentially of," "is," or consisting of" may be substituted therefor.

What is claimed is:

1. The reaction product of a polyalkylhydrosiloxane and one or more vinyl terminated macromonomers (VTMs).

2. The reaction product of claim 1, wherein the VTM is one or more of:
   wherein the VTM is one or more of:
   (i) a vinyl terminated polymer having at least 5% allyl chain ends;
   (ii) a vinyl terminated polymer having an Mn at least 160 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
   (iii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;
   (iv) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl terminated macromonomer has at least 40% allyl chain ends relative to total unsaturation;
   (v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where:
   1) X=(−0.94*(mol % ethylene incorporated)+100), when 10 mol % to 60 mol % ethylene is present in the co-oligomer,
   2) X=45, when greater than 60 mol % and less than 70 mol % ethylene is present in the co-oligomer, and
   3) X=(1.83* (mol % ethylene incorporated) −83), when 70 mol % to 90 mol % ethylene is present in the co-oligomer;
   (vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;
   (vii) a propylene oligomer, comprising: at least 50 mol % propylene and from 10 mol % to 50 mol % ethylene, wherein the oligomer has: at least 90% allyl chain ends, an Mn of about 150 g/mol to about 20,000 g/mol, and an isobutyl chain end to allylic vinyl group ratio of 0.8:1 to 1.2:1.0, wherein monomers having four or more carbon atoms are present at from 0 mol % to 3 mol %;
   (viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;
   (ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0;
   (x) a homo-oligomer, comprising propylene, wherein the oligomer has: at least 93% allyl chain ends, an Mn of about 500 g/mol to about 70,000 g/mol, an isobutyl chain end to allylic vinyl group ratio of 0.8:1 to 1.2:1.0, and less than 1400 ppm aluminum;
   (xi) vinyl terminated polyethylene having: (a) at least 60% allyl chain ends; (b) a molecular weight distribution of less than or equal to 4.0; (c) a g'$_{(vis)}$ of greater than 0.95; and (d) an Mn ($^1$HNMR) of at least 20,000 g/mol; and
   (xii) vinyl terminated polyethylene having: (a) at least 50% allyl chain ends; (b) a molecular weight distribution of less than or equal to 4.0; (c) a g'$_{(vis)}$ of 0.95 or less; (d) an Mn ($^1$HNMR) of at least 7,000 g/mol; and (e) a Mn (GPC)/Mn ($^1$HNMR) in the range of from about 0.8 to about 1.2.

3. The reaction product of claim 1, wherein the alkyl group of the polyalkylhydrosiloxane is one of methyl, ethyl, propyl, butyl, pentyl, hexyl, decyl, dodecyl, or combinations thereof.

4. The reaction product of claim 1, wherein n+q is at least 5 and PO has an Mn of from 160 to 30,000 g/mol.

5. The reaction product of claim 1, wherein n+q is 1, 2, 3, or 4 and PO has an Mn of from 160 to 40,000 g/mol.

6. The reaction product of claim 1, wherein the composition displays shear thickening at 100 rad/s and above 190° C.

7. The reaction product of claim 4, wherein the composition displays shear thickening at 100 rad/s and above 190° C.

8. The reaction product of claim 1, wherein n+q is 1, 2, 3, 4, or 5; PO has an Mn of from 160 to 40,000 g/mol, and the composition shows a tan delta (G"/G') of 1 or less at 50° C. and at least 30 or more at 80° C.

9. The reaction product of claim 1, wherein the ratio of Si-alkylated to Si—H is about 1:1000.

10. The reaction product of claim 1, wherein the ratio of Si-alkylated to Si—H is about 1:1.

11. The reaction product of claim 1, wherein the ratio of Si—H to Si-alkylated is about 0.1:100.

12. The reaction product of claim 2, wherein the alkyl group of the polyalkylhydrosiloxane is one of methyl, ethyl, propyl, butyl, pentyl, hexyl, decyl, dodecyl, or combinations thereof.

* * * * *